(12) United States Patent
Lawson et al.

(10) Patent No.: US 12,736,750 B2
(45) Date of Patent: Sep. 15, 2026

(54) METHOD AND SYSTEM FOR ALIGNING AND SPLICING POLARIZATION MAINTAINING FIBERS

(71) Applicant: RAM Photonics LLC, San Diego, CA (US)

(72) Inventors: Joseph Lawson, Rochester, NY (US); Jordan Leidner, Rochester, NY (US); Per Adamson, Conesus, NY (US)

(73) Assignee: RAM Photonics Interconnects, LLC, Webster, NY (US)

( * ) Notice: Subject to any disclaimer, the term of this patent is extended or adjusted under 35 U.S.C. 154(b) by 721 days.

(21) Appl. No.: 17/733,323

(22) Filed: Apr. 29, 2022

(65) Prior Publication Data

US 2022/0350080 A1 Nov. 3, 2022

Related U.S. Application Data

(60) Provisional application No. 63/246,849, filed on Sep. 22, 2021, provisional application No. 63/181,873, (Continued)

(51) Int. Cl.
*G02B 6/255* (2006.01)
*G02B 6/42* (2006.01)

(52) U.S. Cl.
CPC ......... *G02B 6/2555* (2013.01); *G02B 6/4206* (2013.01); *G02B 6/4214* (2013.01); *G02B 6/4221* (2013.01); *G02B 6/4227* (2013.01)

(58) Field of Classification Search
CPC .. G02B 6/2555; G02B 6/4206; G02B 6/4214; G02B 6/4221; G02B 6/4227
See application file for complete search history.

(56) References Cited

U.S. PATENT DOCUMENTS 4,537,466 A * 8/1985 Moisson .............. G02B 6/2555 269/902
4,911,524 A * 3/1990 Itoh ...................... G02B 6/2555 385/97

(Continued)

FOREIGN PATENT DOCUMENTS

CN 109471223 A 3/2019
CN 110068895 A 7/2019

OTHER PUBLICATIONS

PCT/US2022/026958 , "International Preliminary Report on Patentability", Nov. 9, 2023, 9 pages.

(Continued)

*Primary Examiner* — Uyen N Le

(57) ABSTRACT

Various embodiments and methods relating to an optical fiber alignment and splicing system are described herein. The optical fiber alignment and splicing system includes a first rotation stage having a first central axis, a first end, and a second end, and a second rotation stage having a second central axis, a third end, and a fourth end. The first central axis extends from the first end to the second end of the first rotation stage, and the second central axis extends from the third end to the fourth end. The first rotation stage includes a first optical fiber channel extending from the first end of the first rotation stage to the second end of the first rotation stage, and the second rotation stage includes a second optical fiber channel extending from the third end of the second rotation stage to the fourth end of the second rotation stage.

15 Claims, 14 Drawing Sheets

Related U.S. Application Data filed on Apr. 29, 2021, provisional application No. 63/181,869, filed on Apr. 29, 2021, provisional application No. 63/181,870, filed on Apr. 29, 2021.

(56) References Cited

U.S. PATENT DOCUMENTS 4,986,843 A * 1/1991 Itoh ...................... G02B 6/2551 356/153
5,013,345 A 5/1991 Itoh et al.
5,149,350 A * 9/1992 Itoh ...................... G02B 6/3805 356/73.1
5,161,207 A 11/1992 Pikulski
5,340,371 A * 8/1994 Dyott ................... G02B 6/3803 269/254 R
5,506,928 A * 4/1996 Evans .................... G02B 6/362 385/136
5,611,015 A * 3/1997 Tokumaru ............ G02B 6/2555 385/98
6,052,505 A 4/2000 Bice et al.
7,077,579 B2 * 7/2006 Bush .................... G02B 6/2557 385/98
9,057,838 B2 * 6/2015 Howell .................. G02B 6/024
2002/0159724 A1 * 10/2002 Oki ...................... G02B 6/2551 385/11
2003/0081915 A1 5/2003 Fajardo et al.
2005/0041939 A1 * 2/2005 Saito .................... G02B 6/2551 385/96
2014/0036256 A1 2/2014 Takahashi et al.

OTHER PUBLICATIONS

Application No. PCT/US2022/026958, International Search Report and Written Opinion, Mailed on Jul. 29, 2022, 10 pages.
EP22796815.3, “Extended European Search Report”, Feb. 24, 2025, 9 pages.

* cited by examiner

METHOD AND SYSTEM FOR ALIGNING AND SPLICING POLARIZATION MAINTAINING FIBERS

CROSS-REFERENCES TO RELATED APPLICATIONS

This application claims the benefit of and priority to U.S. Provisional Application No. 63/181,873, filed Apr. 29, 2021, U.S. Provisional Application No. 63/181,869, filed on Apr. 29, 2021, U.S. Provisional Application No. 63/246,849, filed on Sep. 22, 2021, and U.S. Provisional Application No. 63/181,870, filed on Apr. 29, 2021 which are hereby incorporated by reference in their entirety for all purposes.

STATEMENT REGARDING FEDERALLY SPONSORED RESEARCH OR DEVELOPMENT

This invention was made with Government support under Contract No. N68936-19-F-0001 awarded by The United States Navy. The Government has certain rights in the invention.

BACKGROUND OF THE INVENTION

Polarization maintaining fibers have structures that support propagation of light in predetermined polarizations. When polarization maintaining fibers are spliced together or bonded to optical elements, the polarization maintaining fibers can be aligned during splicing and/or bonding.

Despite the progress made in the development of fiber alignment systems, there is a need in the art for improved methods and systems related to fiber alignment systems.

SUMMARY OF THE INVENTION

The present disclosure relates generally to methods and systems related to optical systems including polarization maintaining fibers. More particularly, embodiments of the present invention provide methods and systems that can be used to align two optical fibers to each other, specifically, the polarization axes of polarization maintaining fibers in advance of fiber splicing. The disclosure is applicable to a variety of applications in lasers and optics, including fiber laser implementations.

Various embodiments methods and systems relating to an optical fiber alignment and splicing system are described herein. The optical fiber alignment and splicing system may include a first rotation stage having a first central axis, a first end, and a second end. The first central axis may extend from the first end to the second end of the first rotation stage. The first rotation stage can include a first optical fiber channel extending from the first end of the first rotation stage to the second end of the first rotation stage. The first rotation stage may be configured to rotate about the first central axis of the first rotation stage. The optical fiber alignment and splicing system may also include a second rotation stage having a second central axis, a third end, and a fourth end. The second central axis may extend from the third end to the fourth end of the second rotation stage. The second rotation stage may include a second optical fiber channel extending from the third end of the second rotation stage to the fourth end of the second rotation stage. The second rotation stage may be configured to rotate about the second central axis of the second rotation stage.

In some embodiments, the optical fiber alignment and splicing system may include a first light source and a second light source. The first light source may be positioned to emit light onto the first optical fiber channel at an oblique angle from the first optical fiber channel and the second light source may also be positioned to emit light onto the second optical fiber channel at an oblique angle from the second optical fiber channel. The optical fiber alignment and splicing system may also include a reflector positioned between the first rotation stage and the second rotation stage and an image sensor positioned to generate an initial image of a first emission face of a first optical fiber disposed within the first optical fiber channel and a second emission face of a second optical fiber disposed within the second optical fiber channel reflected by the reflector. Optionally, the reflector is removable.

In some examples, the optical fiber alignment and splicing system may also include a first rigidly mounted static immobilizer situated to be in contact with a portion of a first optical fiber when positioned in the first optical fiber channel and configured to secure the first optical fiber onto the first rotation stage. The optical fiber alignment and splicing system may also include a second rigidly mounted static immobilizer situated to be in contact with a portion of a second optical fiber when positioned in the second optical fiber channel and configured to secure the second optical fiber onto the second rotation stage. Optionally, the first rigidly mounted static immobilizer is positioned between the first rotation stage and the reflector and the second rigidly mounted static immobilizer is positioned between the second rotation stage and the reflector. In Exemplary embodiments, the first rigidly mounted static immobilizer includes a vacuum chuck.

In some embodiments, the optical fiber alignment and splicing system includes a first mechanical immobilizer and a second mechanical immobilizer. The first mechanical immobilizer is configured to secure the first optical fiber when the first rotation stage rotates about the first central axis of the first rotation stage and the second mechanical immobilizer is configured to secure the second optical fiber when the second rotation stage rotates about the second central axis of the second rotation stage. In examples, the first mechanical immobilizer is positioned between the first rotation stage and the first rigidly mounted static immobilizer and the second mechanical immobilizer is positioned between the second rotation stage and the second rigidly mounted static immobilizer. In some embodiments, a first optical fiber provided in the first optical fiber channel and a second optical fiber provided in the second optical fiber channel each comprise one or more stress rods. In other embodiments, a first optical fiber provided in the first optical fiber channel and a second optical fiber provided in the second optical fiber channel each comprise one or more patterned microstructures.

A method of aligning an optical fiber is also included herein. The method may include placing a first optical fiber on a first rotation stage and placing a second optical fiber on a second rotation stage. The first optical fiber may be secured on the first rotation stage and the second optical fiber may be secured on the second rotation stage. The method may also include collecting an initial image of a first emission face of the first optical fiber and a second emission face of the second optical fiber. An alignment offset based on the initial image may be calculated. The first optical fiber may be rotated to a modified position if the alignment offset is not within a tolerance. The method may include iteratively collecting at least one more additional image of the first emission face of the first optical fiber and the second emission face of the second optical fiber; and releasing the optical fiber if the alignment offset is within the tolerance.

In some examples, the method may include determining a first alignment offset for the first optical fiber and determining a second alignment offset for the second optical fiber. The method may also include determining a rotational offset based on the initial image and determining a translational offset based on the initial image. In some embodiments, the method may include identifying a first region and a second region in the initial image of the first emission face, and identifying a third region and a fourth region in the initial image of the second emission face. A first degree of rotational offset of the first optical fiber may be calculated based on the first region and the second region and a second degree of rotational offset of the second optical fiber may be calculated based on the third region and the fourth region. The method may include calculating the rotational offset based on the first degree of rotational offset and the second degree of rotational offset.

In some embodiments, the method may include contacting the first optical fiber with a vacuum chuck and inducing a vacuum on the first optical fiber using the vacuum chuck. In some examples, the method may include determining that the alignment offset is not within the tolerance and after determining that the alignment offset is not within the tolerance, the method may include releasing the first optical fiber. Then, after rotating the first optical fiber to the modified position, the method may include securing the first optical fiber on the first rotation stage in the modified position. In some examples, after determining the alignment offset is not within the tolerance, the method may include closing a mechanical immobilizer about the first optical fiber to immobilize the first optical fiber. Then, after rotating the first optical fiber to the modified position, the method may include opening the mechanical immobilizer about the first optical fiber to release the first optical fiber.

In some embodiments, the method may include, after determining the alignment offset is not within the tolerance, closing a mechanical immobilizer about the first optical fiber to immobilize the first optical fiber and after rotating the first optical fiber to the modified position, opening the mechanical immobilizer about the first optical fiber to release the first optical fiber. In examples, when the method includes rotating the first optical fiber to the modified position if the alignment offset is not within the tolerance, the method may further include rotating the first optical fiber based on the rotational offset of the first optical fiber, and translating the first optical fiber based on the translational offset of the first optical fiber.

The method may also include rotating the first optical fiber based on the rotational offset of the first optical fiber and translating the first optical fiber based on the translational offset of the first optical fiber. Optionally, the method includes determining that the alignment offset is within the tolerance and releasing the first optical fiber from the first rotation stage. In some examples, the method includes removing equipment between the first optical fiber and the second optical fiber and contacting the first emission face of the first optical fiber with the second emission face of the second optical fiber. In some embodiments, the method may include splicing the first emission face of the first optical fiber to the second emission face of the second optical fiber.

In another example, another method of aligning an optical fiber may be provided. The method may include placing a first optical fiber on a first rotation stage, engaging a first static immobilizer to secure the first optical fiber on the first rotation stage, collecting an initial image of a first emission face of the first optical fiber, determining, based on the initial image, a first position of the first emission face, determining a first target position for the first emission face, disengaging the first static immobilizer to release the first optical fiber, engaging a first mechanical immobilizer to secure the first optical fiber during rotation, rotating the first optical fiber to the first target position, and disengaging the first mechanical immobilizer to release the first optical fiber.

In some embodiments, the method may further include placing a second optical fiber on a second rotation stage, engaging a second static immobilizer to secure the second optical fiber on the second rotation stage, collecting the initial image, wherein the initial image comprises the first emission face of the first optical fiber and a second emission face of the second optical fiber, determining, based on the initial image, a second position of the second emission face, determining a second target position for the second emission face, disengaging the second static immobilizer to release the second optical fiber, engaging a second mechanical immobilizer to secure the second optical fiber during rotation, rotating the second optical fiber to the second target position, and disengaging the second mechanical immobilizer to release the second optical fiber.

In an example embodiment, the method may further include engaging, after rotation, the first static immobilizer to secure the first optical fiber, collecting a second image of the first emission face, and determining a modified position of the first emission face. Optionally, the method may include determining that the modified position of the first emission face is within a threshold of the first target position, and disengaging the first static immobilizer to release the first optical fiber.

Numerous benefits are achieved by way of the present disclosure over conventional techniques. For example, embodiments of the present disclosure, provide methods and systems for determining the position and orientation of stress rods within a pair of optical fibers and splicing the pair of optical fibers together with a precise alignment state between the stress rods in each of the pair of optical fiber. Advantageously, these methods and systems allow for alignment of the polarization axis of the pair of optical fibers without the need for costly or complex illumination setups and techniques. In fact, these methods and systems may allow for the pair of optical fibers to be aligned and spliced using a single device, increasing the efficiency of alignment and reducing the time required for splicing.

Additionally, embodiments of the present invention are characterized by a wide tolerance range, thereby allowing for variation in approach without impacting the results. For example, a laser does not have to be precisely aligned with the polarization of the specific optical fibers to accurately identify the stress rods. Instead, a light source may be applied within a wide range of angles to identify the stress rods of an optical fiber. Moreover, these methods and systems are agnostic to the type of fiber, allowing for alignment of various types of fibers. These and other embodiments of the disclosure, along with many of its advantages and features, are described in more detail in conjunction with the text below and corresponding figures.

DETAILED DESCRIPTION OF SPECIFIC EMBODIMENTS

The present disclosure relates generally to methods and systems related to optical systems including polarization maintaining fibers. More particularly, embodiments of the present invention provide methods and systems that can be used to align two optical fibers to each other, specifically, the polarization axes of polarization maintaining fibers in advance of fiber splicing. The disclosure is applicable to a variety of applications in lasers and optics, including fiber laser implementations.

Figure 1:
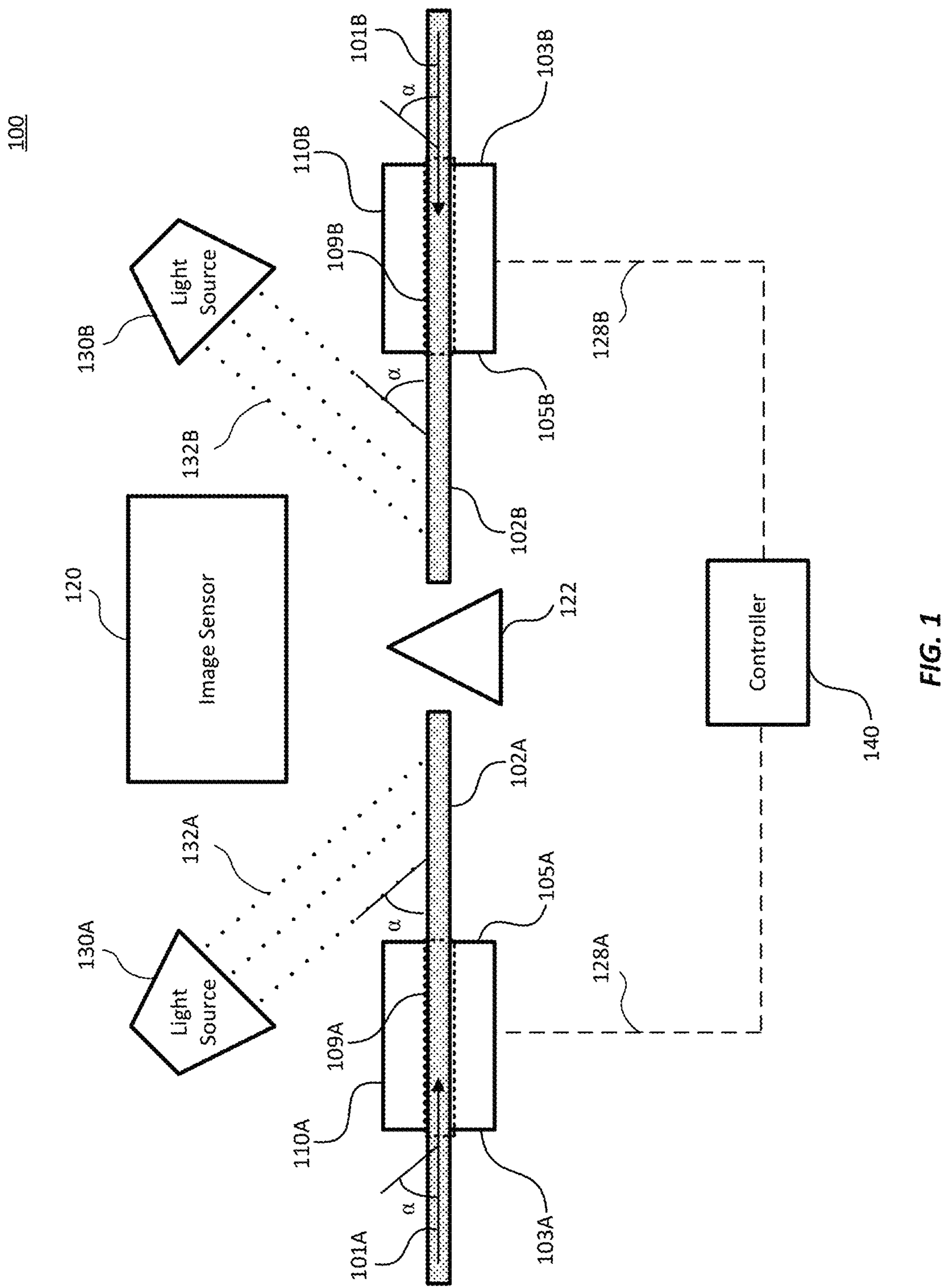
FIG. 1 is a simplified schematic diagram of a fiber alignment and splicing system according to an embodiment of the present invention.

FIG. 1 is a simplified schematic diagram of a fiber alignment and splicing system 100 according to an embodiment of the present invention. Fiber alignment and splicing system 100 may include a first rotation stage 110A and a second rotation stage 110B. First rotation stage 110A may include a first central axis 101A, a first end 103A, and a second end 105A. First central axis 101A may extend from first end 103A to second end 105A of first rotation stage 110A. First rotation stage 110A may be configured to rotate about first central axis 101A. Similarly, second rotation stage 110B may include a second central axis 101B, a third end 103B, and a fourth end 105B. Second central axis 101B may extend from third end 103B to fourth end 105B of second rotation stage 110B. Second rotation stage 110B may be configured to rotate about second central axis 101B.

Each of first rotation stage 110A and second rotation stage 110B may be configured to receive an optical fiber. For example, first rotation stage 110A may be configured to receive a first optical fiber 102A and second rotation stage 110B may be configured to receive a second optical fiber 102B. First rotation stage 110A may include a first optical fiber channel 109A for receiving first optical fiber 102A. Similarly, second rotation stage 110B may include a second optical fiber channel 109B for receiving second optical fiber 102B. First optical fiber channel 109A may extend from first end 103A to second end 105A of first rotation stage 110A in a manner parallel to first central axis 101A. Second optical fiber channel 109B may extend from third end 103B to fourth end 105B of second rotation stage 110B. It should be understood that first optical fiber channel 109A and second optical fiber channel 109B may extend through the bulk of first rotation stage 110A and second rotation stage 110B, respectively. Although FIG. 1 depicts first optical fiber 102A and second optical fiber 102B as external or disposed on the side of first rotation stage 110A and second rotation stage 110B, this illustration is merely for ease of illustration and it will be appreciated that first optical fiber 102A and second optical fiber 102B are supported by first rotation stage 110A and second rotation stage 110B, respectively. As discussed in greater detail below, first optical fiber channel 109A and second optical fiber channel 109B may be slots or channels within each respective rotation stage.

In some embodiments, one or both of the first optical fiber channel 109A and the second optical fiber channel 109B may be configured as a v-groove. Configuration of one or both of the first optical fiber channel 109A and the second optical fiber channel 109B as a v-groove may be advantageous for providing precise alignment of the first optical fiber 102A and the second optical fiber 102B. For example, a v-groove configuration of the first optical fiber channel 109A and the second optical fiber channel 109B may minimize movement along a central axis of the first optical fiber 102A and the second optical fiber 102B, respectively, between and during rotation and translation of the fibers. Minimizing movement of the first optical fiber 102A and the second optical fiber 102B can provide for faster alignment times because less movement of the fibers can reduce the number of iterations required for alignment.

Fiber alignment and splicing system 100 may include a first light source 130A and a second light source 130B. First light source 130A may be positioned to emit light 132A onto first rotation stage 110A. Similarly, second light source 130B may be positioned to emit light 132B onto second rotation stage 110B. In some embodiments, first light source 130A may be positioned to emit light 132A onto first optical fiber channel 109A disposed within first rotation stage 110A and second light source 130B may be positioned to emit light 132B onto the second optical fiber channel 109B disposed within second rotation stage 110B. First light source 130A and second light source 130B may be configured to simultaneously or concurrently illuminate first optical fiber 102A and second optical fiber 102B when first optical fiber 102A and second optical fiber 102B are positioned within first optical fiber channel 109A and second optical fiber channel 109B, as discussed herein. First light source 130A and second light source 130B may include a laser, a light emitting diode (LED), an arc lamp, a fiber optic illuminator, an incandescent source, a fluorescent source, a phosphorescent source, or the like. In some embodiments, first light source 130A and second light source 130B may include the same type of light source, while in other embodiments they include different types of light sources.

Each of first light source 130A and second light source 130B may emit light 132A and light 132B, respectively, at an emission angle $\alpha$. The emission angle $\alpha$ may be an angle that is non-perpendicular from the corresponding central axis. For example, the emission angle $\alpha$ of light 132A may be non-perpendicular from first central axis 101A of first rotation stage 110A and the emission angle $\alpha$ of light 132B may be non-perpendicular from second central axis 101B of second rotation stage 110B. In some embodiments, the emission angle $\alpha$ may be an oblique angle from the corresponding central axis. For example, the oblique angle may be less than 90°, less than 80°, less than 70°, less than 60°, less than 50°, less than 40°, less than 30°, less than 20°, or less than 10° from the corresponding central axis. As described more fully herein, the oblique angle facilitates optical coupling of emitted light 132A onto first rotation stage 110A and light 132B onto second rotation stage 110B. The emission angle $\alpha$ of light 132A may not be congruent with channel 109A and the emission angle $\alpha$ of light 132B may not be congruent with channel 109B. Thus, light 132A emitted by light source 130A can be coupled into optical fiber 102A and light 132B emitted by light source 130B can be coupled into optical fiber 102B.

Light 132A and light 132B may transmit through optical fiber 102A and optical fiber 102B, respectively, and exit via an emission face of each fiber. A reflector 122 may be positioned between first rotation stage 110A and second rotation stage 110B at a position disposed along both first central axis 101A and second central axis 101B. In some embodiments, reflector 122 may be positioned adjacent to the emission faces of first optical fiber 102A and second optical fiber 102B. Reflector 122 may be positioned to reflect the emission faces of first optical fiber 102A and second optical fiber 102B. An exemplary reflector 122 may include a mirror, reflective elements, refractive elements, or any suitable optical element that redirect light waves.

In some cases, reflector 122 may be positioned to reflect the emission faces of first optical fiber 102A and second optical fiber 102B toward an image sensor 120. Image sensor 120 may be positioned to generate an image that includes both the emission faces of first optical fiber 102A and second optical fiber 102B as a single image when first optical fiber 102A and second optical fiber 102B are disposed in their respective optical fiber channels. In some embodiments, image sensor 120 may be positioned adjacent to second end 105A of first rotation stage 110A and fourth end 105B of second rotation stage 110B. Thus, image sensor 120 may include any sensor that is capable of sensing light emitted from the emission faces of first optical fiber 102A and second optical fiber 102B. For example, image sensor 120 may be a camera.

In some embodiments, image sensor 120 may be large enough to concurrently or simultaneously image both the emission face of the first optical fiber 102A and the emission face of the second optical fiber 102B. Using a single image sensor to generate a single image of both emission faces of the first optical fiber 102A and the second optical fiber 102B may reduce alignment time and provide for precise alignment of the optical fibers. For example, to image the emission faces of two optical fibers, traditional systems and methods require that the image sensor to be at a first position to generate an image of a first emission face and then move to a second position to generate an image of the second emission face. Moving the image sensor between the two positions and generating two images of the different emission faces takes time and can impact alignment time. Although use of a single image sensor 120 may result in a higher cost system because of the cost of a larger image sensor and potential loss of magnification, utilization of a single image sensor 120 allows for generation of a single image containing both emission faces. A single image containing both emission faces may be advantageous because it can allow for more accurate alignment of the emission faces and components thereof (e.g., stress rods). For example, as discussed in greater detail below, pixels within the single image can be used for alignment purposes, providing for more accurate alignment than is achievable using separate emission face images. As an example, imaging two emission faces concurrently, a first pixel position can be identified as the pixel position at which the center of the first emission face should be positioned and a second pixel position can be identified as the pixel position at which the center of the second emission face should be positioned in order to align the two optical fibers so that their cores are positioned at matching or calibrated pixel coordinates.

Image processing techniques can be utilized to process a sub-image of the emission face of the first optical fiber 102A and a sub-image of the emission face of the second emission face 102B from the single image generated by image sensor 120. In other embodiments, multiple image sensors that are registered to each other are utilized in place of a single image sensor. In some embodiments, a single image sensor is utilized in a sequential manner, imaging the emission face of the first optical fiber 102A and the emission face of the second emission face 102B sequentially in order to obtain alternating images. In other embodiments, as described above, a single image sensor is utilized to obtain sub-images of each of the emission faces concurrently, for example, simultaneously or concurrently. One of ordinary skill in the art would recognize many variations, modifications, and alternatives.

Fiber alignment and splicing system 100 may also include a controller 140. Controller 140 may be operationally coupled with first rotation stage 110A and second rotation stage 110B via communication line 129A and a communication line 129B, respectively. In some embodiments, controller 140 may also be operationally coupled with image sensor 120. For example, after image sensor 120 generates an image of the emission faces of first optical fiber 102A and second optical fiber 102B, image sensor 120 may send the image to controller 140. Controller 140 may perform various steps of the methods described herein. For example, controller 140 may determine a rotation angle for one or both of first rotation stage 110A and second rotation stage 110B based on the image of the emission faces received from image sensor 120. Controller 140 may communicate instructions for the rotation angle to first rotation stage 110A and second rotation stage 110B via communication line 128. In response to receiving the instructions, first rotation stage 110A and second rotation stage 110B may rotate to the rotation angle received from controller 140. Although not shown, in some embodiments, controller 140 may also be operationally coupled with first light source 130A and second light source 130B. To rotate, first rotation stage 110A and second rotation stage 110B may include various components to rotate and secure each optical fiber during rotation.

One or both of first rotation stage 110A and second rotation stage 110B may be configured to rotate and/or translate first optical fiber 102A and second optical fiber 102B, respectively. Translate, as used herein, can mean moving an optical fiber from a first position to a second position and rotate, as used herein, can mean turning (e.g., rotating) an optical fiber about its central axis. The meaning of both terms is further defined in the following discussion. FIGS. 2-5 illustrate components according to various embodiments used to rotate and translate one or both of first optical fiber 102A and second optical fiber 102B.

Figure 2:
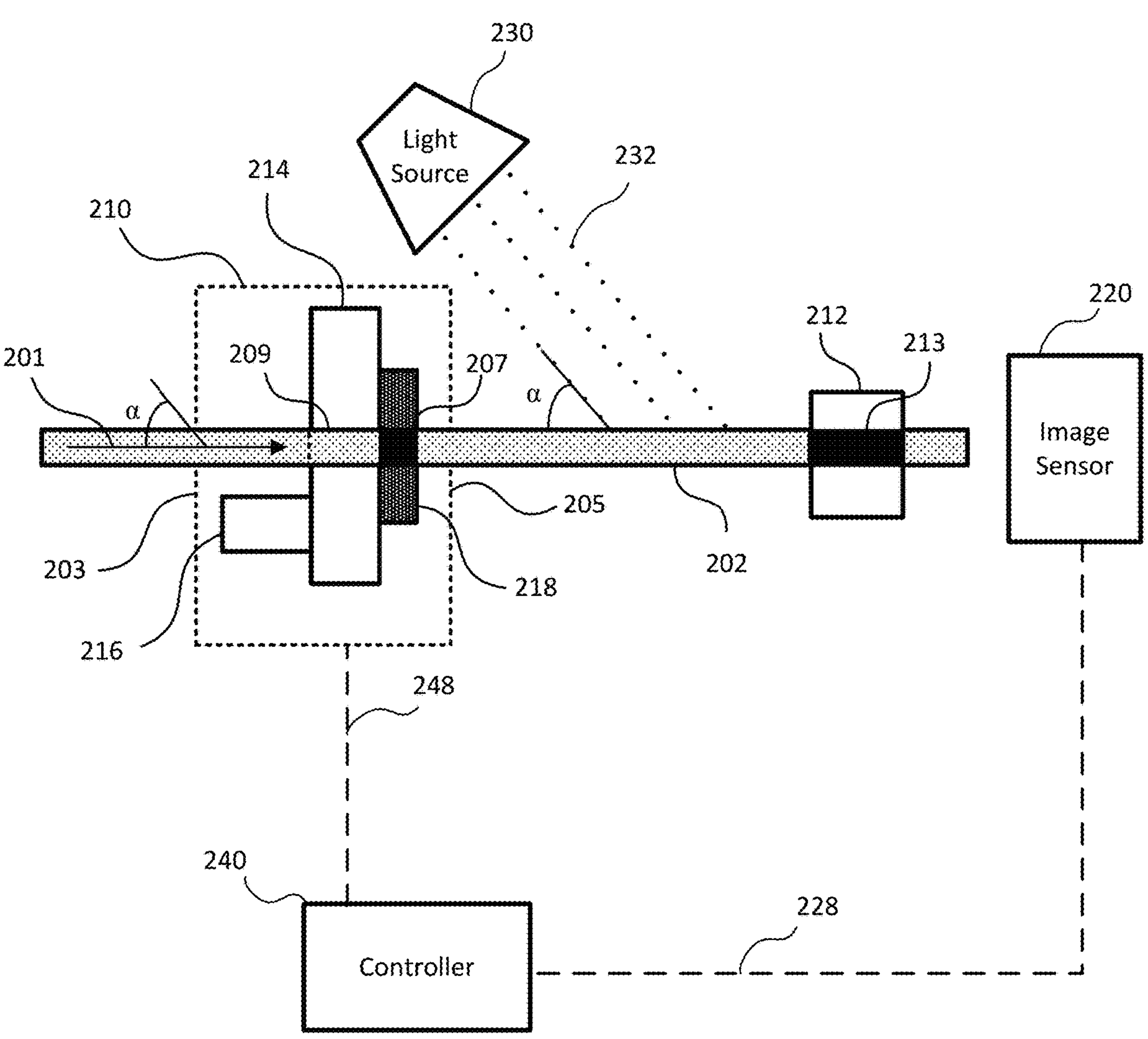
FIG. 2 is a simplified perspective diagram illustrating components of the fiber alignment and splicing system illustrated in FIG. 1.

FIG. 2 is a simplified perspective diagram illustrating components of the fiber alignment and splicing system 200 illustrated in FIG. 1. Fiber alignment and splicing system 200 may be the same or similar to figure alignment and splicing system 100. For example, fiber alignment and splicing system 200 may include a rotation stage 210, a light source 230, an image sensor 220, and a controller 240. Rotation stage 210 may be one of first rotation stage 110A and/or second rotation stage 110B. Fiber alignment and splicing system 200 may include a light source 230 positioned to emit light 232 onto an optical fiber 202. Light source 230 may be one of first light source 130A and/or second light source 130B. Image sensor 220 may be the same as image sensor 120 and controller 240 may be the same as controller 140.

An optical fiber 202 may be disposed within rotation stage 210. For example, optical fiber 202 may be disposed within an optical fiber channel 209 within rotation stage 210. Before and/or during rotation of rotation stage 210, optical fiber 202 may be secured within optical fiber channel 209. The fiber alignment and splicing system 200 may include various components to secure the optical fiber 202 onto the rotation stage 210 and provide for precise alignment of optical fiber 202. For example, fiber alignment and splicing system may include a static immobilizer 212 and a mechanical immobilizer 218. As discussed in greater detail below, static immobilizer 212 and mechanical immobilizer 218 may be used sequentially or at different steps of an alignment process to secure optical fiber 202 and improve alignment of optical fiber 202.

Static immobilizer 212 may secure optical fiber 202 in place when optical fiber 202 is disposed in optical fiber channel 209 of the rotation stage 210. For example, static immobilizer 212 may be a vacuum chuck. In such cases, a portion 213 of optical fiber 202 may contact static immobilizer 212 and a vacuum may be applied to optical fiber 202 to secure optical fiber 202 in place.

Static immobilizer 212 may secure optical fiber 202 in place when image sensor 220 is generating an image of an emission face of optical fiber 202. Securing optical fiber 202 may be necessary because optical fiber 202 may have a curl or kinks along its length due to manufacturing, storage, or its natural state. Securing optical fiber 202 may direct the emission face of optical fiber 202 toward image sensor 220, via a reflector in some cases, so that image sensor 220 can readily generate an image of the emission face.

Image sensor 220 may be operationally coupled to controller 240 via communication line 228. Controller 240 may also be operationally coupled with static immobilizer 212 via communication line 248. Controller 240 may communicate instructions to static immobilizer 212 in order to secure and release optical fiber 202. For example, controller 240 may communicate instructions to engage static immobilizer 212 in preparation for image sensor 220 to generate an image of the emission face of optical fiber 202.

Rotation stage 210 may be configured to rotate about a central axis 201. Central axis 201 may extend from a first end 203 to a second end 205 of rotation stage 210. To facilitate rotation, rotation stage 210 may include a rotator assembly 214 and a drive assembly 216. To secure optical fiber 202 during rotation, rotation stage 210 may also include mechanical immobilizer 218. Mechanical immobilizer 218 may contact a portion 207 of optical fiber 202. In some embodiments, mechanical immobilizer 218 may be positioned toward a second end 205 of rotation stage 210. For example, mechanical immobilizer 218 may be positioned between rotator assembly 214 and static immobilizer 212. Mechanical immobilizer 218 is discussed in greater detail with reference to the following FIGS. 3 and 4.

Figure 3:
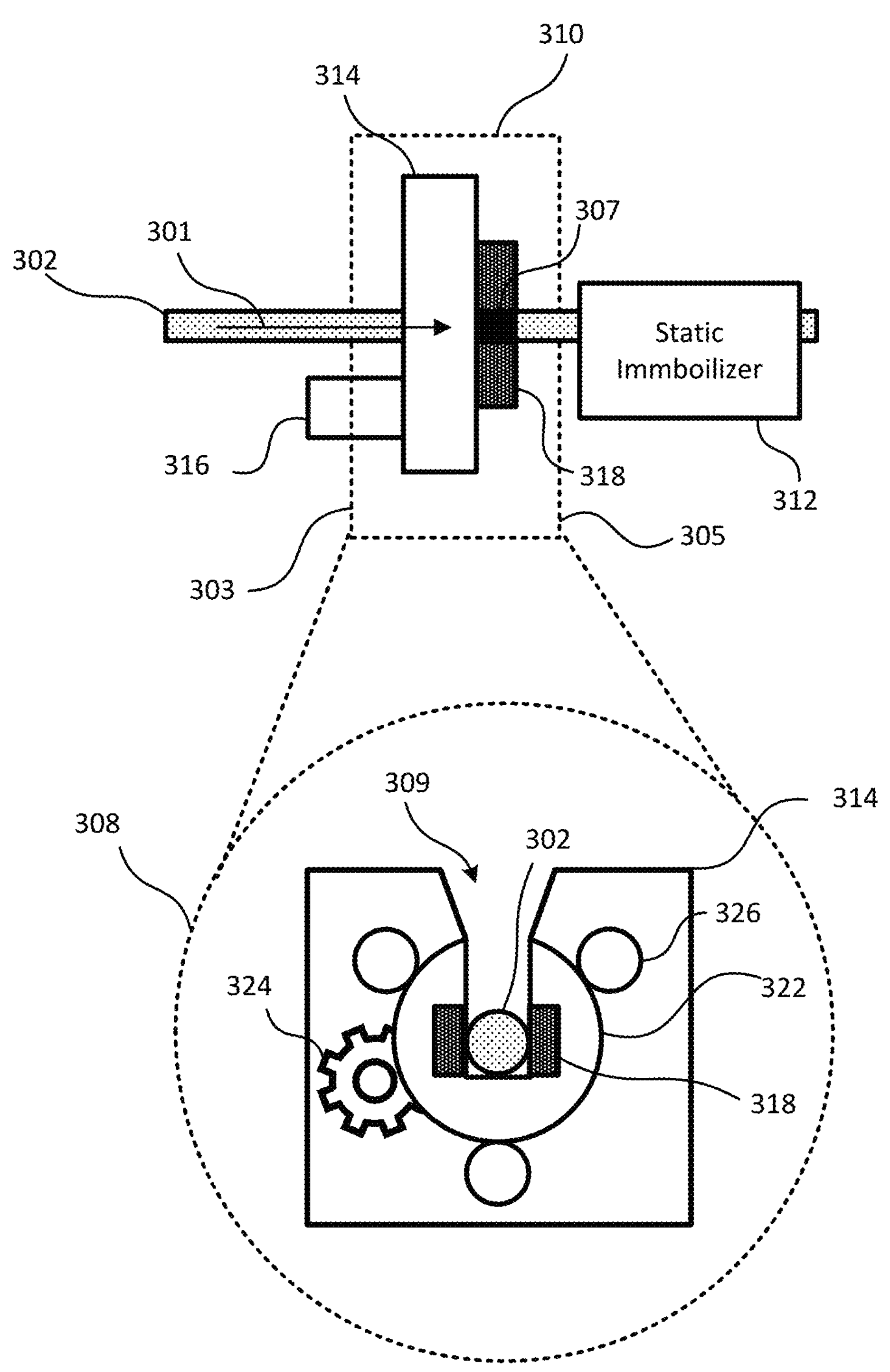
FIG. 3 is a simplified schematic diagram illustrating components of the rotation stage of the fiber alignment and splicing system illustrated in FIG. 1.

FIG. 3 is a simplified schematic diagram 300 illustrating components of the rotation stage 310 of the fiber alignment and splicing system illustrated in FIG. 1. Similar to rotation stage 210, rotation stage 310 may include a rotator assembly 314 and a drive assembly 316. A static immobilizer 312 may be positioned adjacent to rotation stage 310. A blowup view 308 of rotation stage 310 provides a front view facing towards rotation stage 310 as viewed from static immobilizer 312. Rotation stage 310 may be configured to receive an optical fiber 302. To receive optical fiber 302, rotation stage 310 may include a channel 309. Channel 309 may be an optical fiber channel through which rotation stage 310 receives optical fiber 302. Channel 309 may extend from a first end 303 of rotation stage 310 to a second end 305 of rotation stage 310. Channel 309 may extend parallel to a central axis 301 of rotation stage 310. As shown, optical fiber 302 may be disposed in channel 309.

To secure optical fiber 302 during rotation of rotation stage 310, rotation stage 310 may include a mechanical immobilizer 318, which may be the same or similar to mechanical immobilizer 218. In some embodiments, optical fiber 302 may extend out in a cantilevered fashion from channel 309 of rotation stage 310. Mechanical immobilizer 318 may be positioned to contact a portion 307 of optical fiber 302 that extends outside channel 309. Mechanical immobilizer 318 may be configured to secure optical fiber 302 when rotation stage 310 rotates about central axis 301. For example, mechanical immobilizer 318 may include two pads positioned on either side of optical fiber 302 that may contact optical fiber 302 and mechanically constrain optical fiber 302 during rotation. Mechanical immobilizer 318 may maintain the physical position of optical fiber 302 while rotating optical fiber 302 about central axis 301. In other words, the coordinates of optical fiber 302 remain unchanged during rotation. In some cases, mechanical immobilizer 318 may provide a compression force to optical fiber 202 to secure optical fiber 202 during rotation. In some embodiments, mechanical immobilizer 318 may be positioned between rotation stage 310 and static immobilizer 312.

To rotate rotation stage 310, rotator assembly 314 may include a rotator hub 322, a drive sprocket 324, and one or more rollers 326. Drive assembly 316 may be mechanically coupled to rotator assembly 314 to rotate rotation stage 310. Specifically, drive assembly 316 may include a motor (not shown) that transfers rotational energy to drive sprocket 324, which in transfers the rotational energy to rotator hub 322 and rollers 326, thereby rotating optical fiber 302 in optical fiber channel 309.

Figure 4:
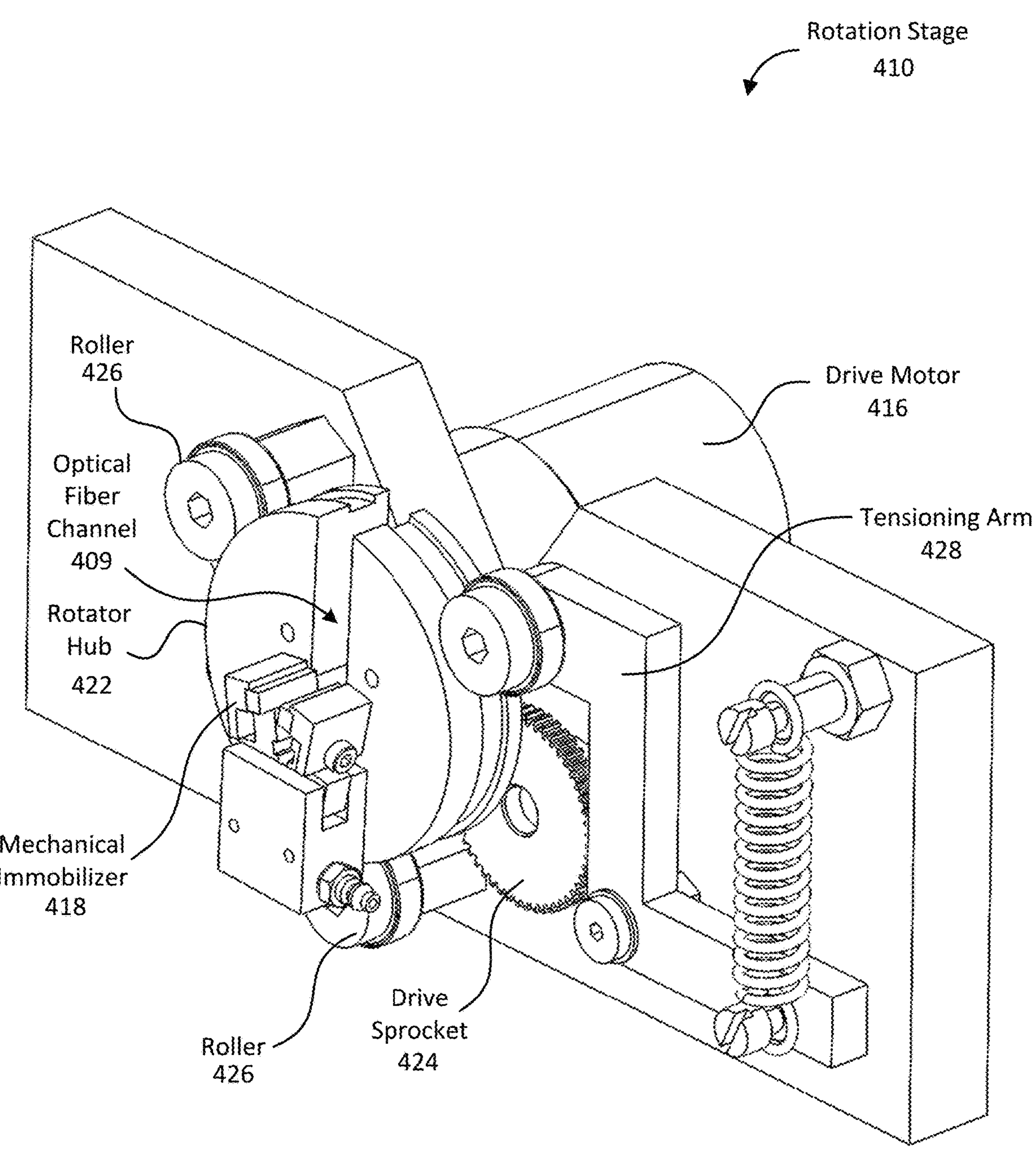
FIG. 4 is a schematic diagram illustrating the components of the rotation stage illustrated in FIG. 3.

FIG. 4 is a schematic diagram illustrating the components of the rotation stage illustrated in FIG. 3. FIG. 4 depicts rotation stage 410, which may be the same as rotation stage 310. As shown, rotation stage 410 may include various components for rotating rotation stage 410. For example, rotation stage 410 may include a drive motor 416. Drive motor 416 may provide mechanical energy for rotating rotation stage 410. Drive motor 416 may be mechanically coupled with a drive sprocket 424. Drive sprocket 424 may, in turn, be mechanically coupled with one or more rollers 426. One or more rollers 426 may be positioned such to transfer rotational energy from drive sprocket 424 to a rotator hub 422. Rotator hub 422 may include an optical fiber channel 409 for disposing an optical fiber therein. A mechanical immobilizer 418 may be positioned adjacent to optical fiber channel 409 such to grasp or secure an optical fiber when disposed within optical fiber channel 409. Accordingly, when rotator hub 422 rotates, the optical fiber disposed within optical fiber channel 409 rotates along with rotator hub 422. In some embodiments, rotation stage 410 may include a tensioning arm 428. Tensioning arm 428 may cause one or more rollers 426 to apply friction to rotator hub 422. By applying tension to rotator hub 422, the speed and rotation angle of rotator hub 422 may be controlled in a precise manner.

In some embodiments, the fiber alignment and splicing system described herein may also include a translation stage.

Figure 5:
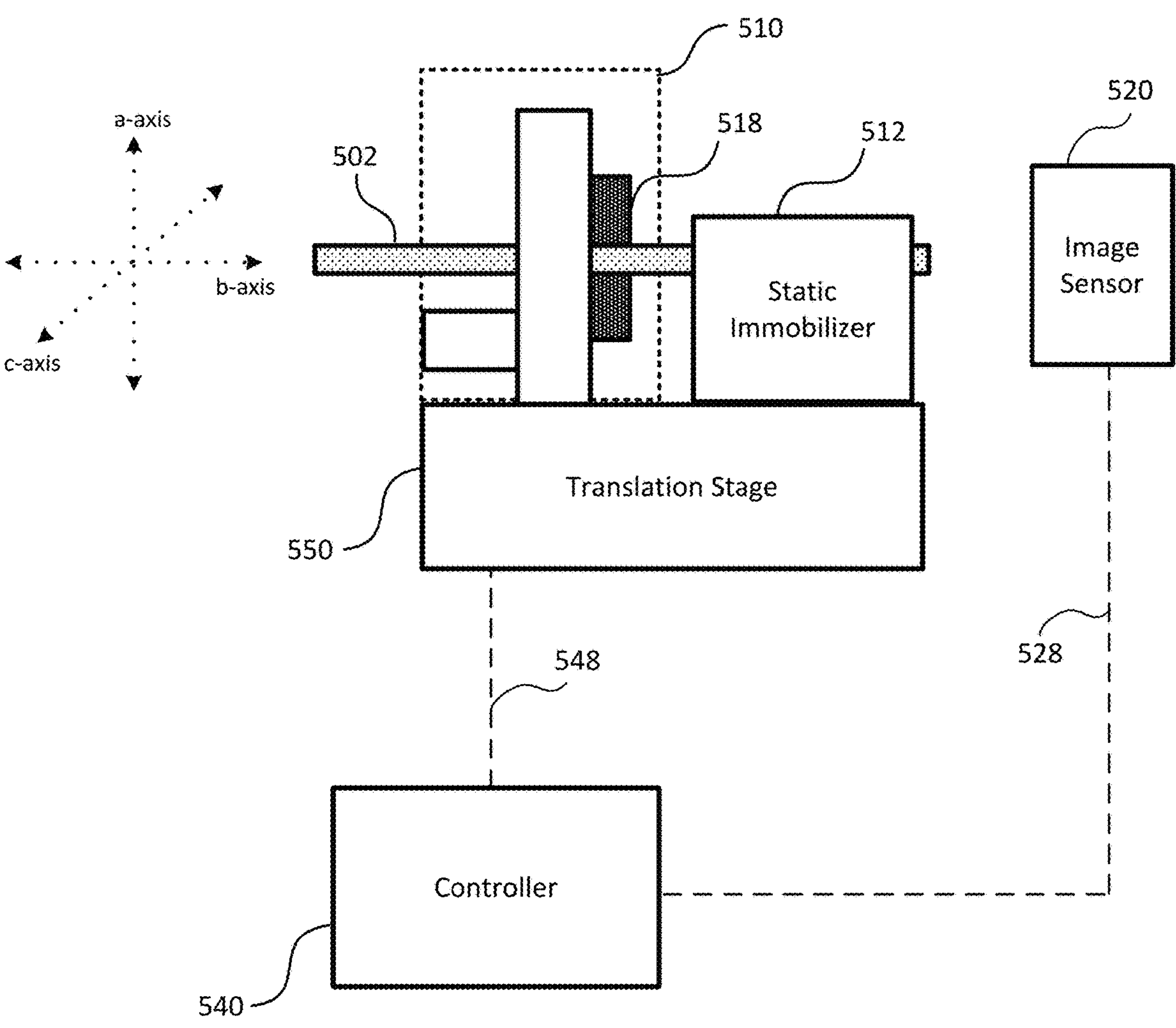
FIG. 5 is a simplified schematic diagram illustrating components of the rotation stage of the fiber alignment and splicing system illustrated in FIG. 1 according to some embodiments.

FIG. 5 is a simplified schematic diagram illustrating components of the rotation stage of the fiber alignment and splicing system illustrated in FIG. 1 according to some embodiments. Fiber alignment and splicing system 500 may be the same or similar to fiber alignment and splicing system 100. For example, fiber alignment and splicing system 500 may include a rotation stage 510, a controller 540, and an image sensor 520. Image sensor 520 may be operationally coupled with controller 540 via communication line 528. Although, fiber alignment and splicing system 500 is depicted in this configuration, it should be understood that fiber alignment and splicing system 500 may be configured in other configurations, such as the fiber alignment and splicing system configuration depicted in FIG. 1.

In some cases, an optical fiber 502 disposed within rotation stage 510 may need to be translated (i.e., the position of the optical fiber may be adjusted up/down or right/left in directions orthogonal to the axis of rotation) in addition to being rotated. For example, as shown, optical fiber 502 may be adjusted up or down along an a-axis, forward or backward with respect to the image sensor along a b-axis, and left or right along a c-axis. To align optical fiber 502 with an external body, optical fiber 502 may need to be adjusted along the a-axis, the b-axis, and/or the c-axis to align with one or more components of the external body. The a-axis, the b-axis, and the c-axis may correspond to a spatial y-axis, a spatial x-axis, and a spatial z-axis. This is in contrast to the rotational y-axis, rotational x-axis, and rotational z-axis discussed below with respect to FIGS. 7A-D and 8A-D.

To translate optical fiber 502, fiber alignment and splicing system 500 may include translation stage 550. Translation stage 550 may be operationally coupled with rotation stage 510. In some embodiments, translation stage 550 may adjust rotation stage 510 along the a-axis and/or c-axis with relation to an external body (not shown). Translation stage 550 may also be positioned to adjust static immobilizer 512. A mechanical immobilizer 518 may be positioned between rotation stage 510 and static immobilizer 512.

Translation stage 550 may be operationally coupled with controller 540 via communication line 548. In an exemplary scenario, image sensor 520 may generate an image of an emission face of optical fiber 502 and transmit the image of the emission face to controller 540. Controller 540 may determine that optical fiber 502 has a translational offset. Based on the translational offset, controller 540 may transmit instructions to translation stage 550 via communication line 548 to translate optical fiber 502. Based on the instructions received from controller 540, translation stage 550 may adjust rotation stage 510 to translate optical fiber 502 accordingly. For example, translation stage 550 may raise or lower rotation stage 510. In some cases, translation stage 550 may adjust rotation stage 510 from side-to-side. Although not shown, translation stage 550 may include a mechanical or motorized means of moving rotation stage 510.

It should be appreciated that the optical fibers discussed herein, such as optical fiber 502, may be rotated and translated simultaneously or concurrently. In other cases, rotation and translation of an optical fiber may be done sequentially or at different stages of an alignment process.

Figure 6A:
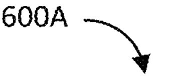
FIG. 6A is an exemplary image generated by a single image sensor depicting the emission faces of two optical fibers according to an embodiment of the present invention.
Figure 6A:
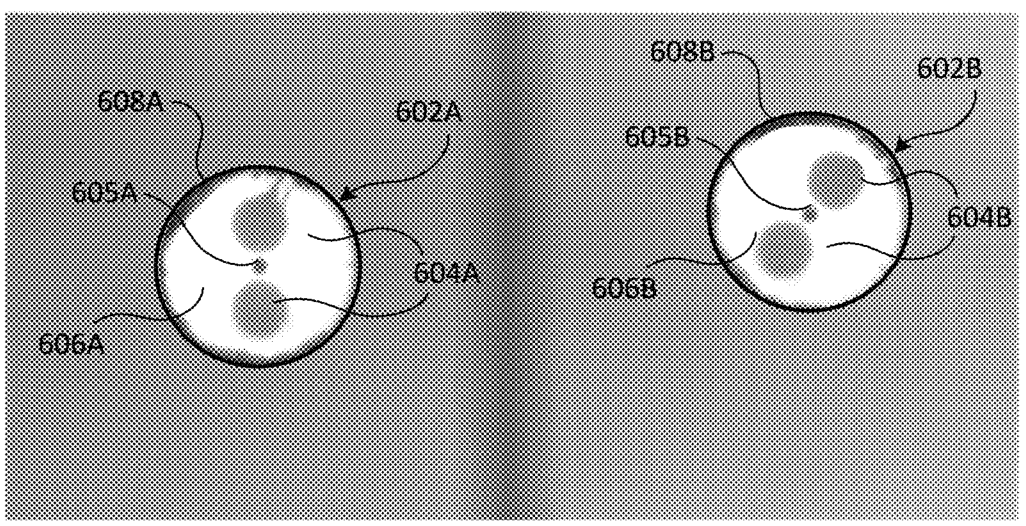

FIG. 6A is an exemplary image 600A generated by a single image sensor depicting the emission faces of two optical fibers according to an embodiment of the present invention. The exemplary emission image 600A was generated using an image sensor, such as image sensor 120, of the fiber alignment and splicing system illustrated in FIG. 1. As shown, image 600A depicts an image of a first emission face 602A and a second emission face 602B. First emission face 602A may correspond to a first optical fiber, such as first optical fiber 102A, and second emission face 602B may correspond to a second optical fiber, such as second optical fiber 102B. First emission face 602A may include portions that can be identified as corresponding to the stress rods 604A, the core 605A, and the cladding 606A of optical fiber 102A. In image 600A, stress rods 604A are shown as darker circles within the lighter cladding 606A. Core 605A is also shown as a darker spot within cladding 606A. Typically, core 605A is positioned near a central point of cladding 606A as shown in FIG. 6A. Similarly, second emission face 602B may include portions that can be identified as corresponding to the stress rods 604B, the core 605B, and the cladding 606B of optical fiber 102B.

First optical fiber 102A was placed in the fiber alignment and splicing system in a manner that resulted in stress rods 604A, rather than being aligned with a vertical axis, being rotated around the central axis by a given amount, which can be referred to as a rotational offset. Similarly, stress rods 604B of second optical fiber 102B are also rotated by a given amount, resulting in a rotational offset. In addition to rotational offset, one or both of first optical fiber 102A and second optical fiber 102B may have a translational offset. For example, first optical fiber 102A was placed in the fiber alignment and splicing system in a manner that resulted in first emission face 602A, rather than being aligned at the same (a, b, c) coordinates, as discussed above with respect to FIG. 5, as second emission face 602B or the respective alignment body, being translated by a given amount to different coordinates, which can be referred to as a translational offset.

The rotational offset and/or translational offset identified by image 600A for each of the first optical fiber 102A and the second optical fiber 102B may be identified as a first position 608A and a second position 608B, respectively, of first emission face 602A and second emission face 602B. As described herein, first position 608A corresponds to the coordinate position of first optical fiber 102A and the rotational alignment of the first optical fiber 102A. Similarly, second position 608B corresponds to the coordinate position of the second optical fiber 102B and the rotational alignment of the second optical fiber 102B. First position 608A and second position 608B may be identified as a region on image 600A that corresponds to first emission face 602A and second emission face 602B, respectively. For example, first position 608A may be identified based on one or more regions of interest of first emission face 602A, such as, stress rods 604A, core 605A, and cladding 606A of optical fiber 102A. Similarly, second position 608B may be identified based on one or more portions of second emission face 602B, such as, stress rods 604B, core 605B, and cladding 606B of optical fiber 102A.

As described herein, by identifying first position 608A of first emission face 602A and second position 608B of second emission face 602B, a target position for each emission face can be determined and one or both of first optical fiber 102A and second optical fiber 102B, can be rotated and/or translated to align with one another. While this discussion refers to aligning first optical fiber 102A with second optical fiber 102B, it should be readily appreciated, that in some embodiments, first optical fiber 102A may be aligned with an external body. In such cases, similar systems and methods may be implemented.

Moreover because the optical fibers can be aligned with respect to calibrated pixel positions of the image sensor, rotation and/or translation of the optical fibers to align with each other can be implemented by rotating and/or translating the optical fibers to the calibrated pixel positions. As an example, in an embodiment, the pixel location associated with the center of the core 605A is measured and the first optical fiber is translated until the pixel location associated with the center of the core 605A corresponds to a predetermined pixel location at which the first optical fiber will be in the desired alignment. Translation can be performed using a mapping between the motion of the first optical fiber and a corresponding change in pixel position. Thus, the difference in pixel location can be translated into motion of the optical fiber. Once the pixel location associated with the center of the core 605A corresponds to the predetermined pixel location, a similar process can be utilized in relation to rotation of the first optical fiber in order to rotate the first optical fiber so that the pixel locations associated with the centers of the stress rods 604A are oriented along a predetermined axis. Similar procedures can be implemented with respect to the second optical fiber. Although this embodiment has been discussed in terms of translation followed by rotation, this order could be reversed or combined as appropriate. Moreover, embodiments of the present invention are suitable for use with both an iterative process in which multiple images are utilized in conjunction with multiple translation/rotation steps or a single step process in which pixel positions are measured and a single translation/rotation operation is utilized to position and orient the fiber to a desired location and orientation. One of ordinary skill in the art would recognize many variations, modifications, and alternatives.

Figure 6B:
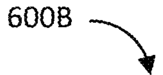
FIG. 6B is an exemplary emission image depicting a first emission face within a threshold area.
Figure 6B:
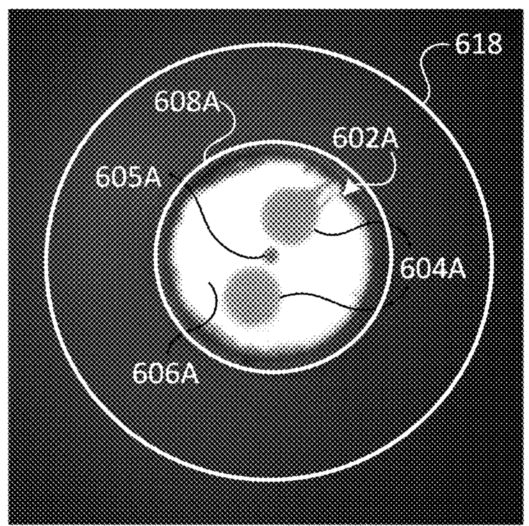

FIG. 6B is an exemplary emission image 600B depicting first emission face 602A within a threshold area 618. Exemplary emission image 600B may be a sub-image of image 600A generated using known techniques. To determine a target position for first emission face 602A, first position 608A may be compared to threshold area 618. Threshold area 618 may indicate that first emission face 602A is positioned such that alignment and splicing can occur within predetermined tolerances. If first emission face 602A is outside of threshold area 618, repositioning of first optical fiber 102A may be utilized as the alignment process proceeds.

Comparing first position 608A to threshold area 618 can include determining that first position 608A is within threshold area 618, as depicted in image 600B. In some embodiments, the determination that first position 608A is within threshold area 618 may include a determination that a percentage of the area of first position 608A is within an area of threshold area 618. For example, a determination that more than 50 percent of the area of first position 608A is within threshold area 618 may indicate that first position 608A is within threshold area 618. In some embodiments, a determination of more than 60%, 70%, 80%, 90%, or 100% of the area of first position 608A is within threshold area 618 indicates that first position 608A is within threshold area 618.

If first position 608A is not within threshold area 618, then first optical fiber 102A may be translated until first position 608A of first emission face 602A is within threshold area 618. For example, first optical fiber 102A may be translated and another image 600A may be generated to determine whether first position 608A is within threshold area 618. An iterative approach may be taken until first position 608A is within threshold area 618. A similar or the same approach may be taken if second position 608B is not within its corresponding threshold area.

Figure 7A:
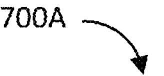
FIG. 7A is an exemplary emission image depicting an optical fiber having a rotational offset according to an embodiment of the present invention.
Figure 7A:
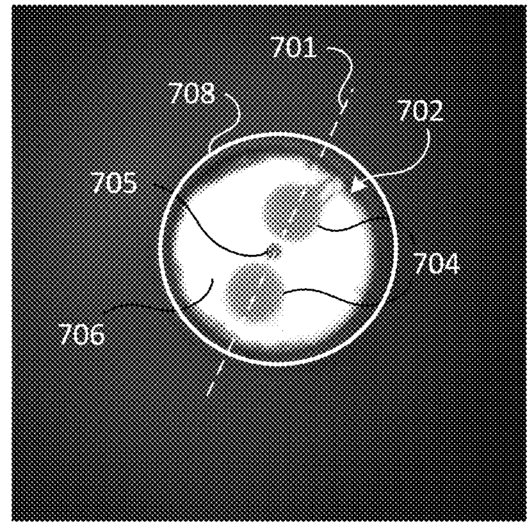

FIG. 7A is an exemplary emission image 700A depicting an emission face 702 having a rotational offset according to an embodiment of the present invention. In some cases, a first position 708 of emission face 702A may include the rotational offset of an optical fiber, such as first optical fiber 102A or second optical fiber 102B. The axis 701 passing through stress rods 704 and core 705 is tilted to the right with respect to the vertical axis and this rotation will be characterized as a rotational offset.

Figure 7B:
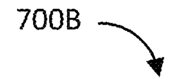
FIG. 7B is a diagram illustrating a computational image used to calculate the rotational offset of the optical fiber illustrated in FIG. 7A.
Figure 7B:
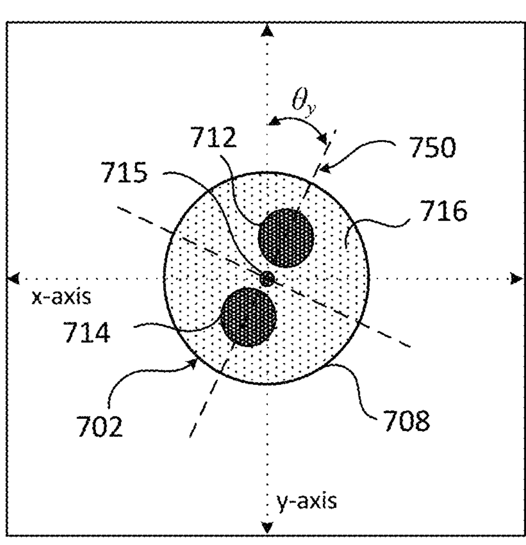

FIG. 7B is a diagram illustrating a computational image 700B used to calculate the rotational offset of the emission face 702 imaged in FIG. 7A. For alignment purposes, it may be desirable that stress rods 704 be vertically aligned along a y-axis illustrated in FIG. 7B. To calculate the rotational offset of emission face 702, computational image 700B may be generated based on emission image 700A. One of several image processing methods can be utilized to detect and/or identify the various components of the optical fiber. In some embodiments, the various components of the optical fiber can be identified based on pixel coordinates within image 700A. Thus, computational image 700B may include regions associated with stress rods 704 and core 705. To identify stress rods 704 and core 705, a first region 712 and a second region 714 may be identified in emission image 700A. First region 712 and second region 714 may be identified by a grey-scale or color difference between stress rods 704 and cladding 706 within emission image 700A. Similarly, core 705 may be identified within emission image 700A by a grey-scale or color difference with cladding 706. As will be evident to one of skill in the art, the geometrical structures present in emission face 702 may be utilized as part of the image processing techniques. Thus, for the illustrated optical fiber, the circular cross-sectional shape of the core, stress rods, and cladding can be utilized in identifying these structures.

Once first region 712 and second region 714 are identified, vertical and horizontal x-y coordinates for first region 712 and second region 714 may be determined. Vertical and horizontal x-y coordinates may also be determined for central region 715, corresponding to core 705, and general region 716, corresponding to cladding 706. Computational image 700B may be generated based on the vertical and horizontal x-y coordinates.

A degree of rotational offset may be calculated for first region 712 and second region 714. To calculate the degree of rotational offset, a vertical rotation offset, $\theta_y$, may be determined from both first region 712 and second region 714. The vertical rotation offset, $\theta_y$, may be determined by identifying a vertical offset axis 750. Vertical offset axis 750 may be determined by aligning the center of first region 712, second region 714, and central region 715. The vertical rotation offset, $\theta_y$, may be determined by comparing vertical offset axis 750 to the vertical y-axis. The degree to which vertical offset axis 750 is rotated from the vertical y-axis may be the vertical rotation offset, $\theta_y$. Using the vertical rotation offset, $\theta_y$, the degree of rotational offset may be determined from first region 712 and second region 714. The rotational offset may be determined based on the degree of rotational offset of emission face 702.

The rotational offset may be part of the alignment offset used to determine whether emission face 702 is within an alignment tolerance of an external body. For example, the alignment offset of emission face 702 may include the rotational offset and a translational offset of emission face 702. For alignment of emission face 702 with the external body, stress rods 704 may need to be at a specific angular orientation. For example, if emission face 702 is to be spliced with another optical fiber, stress rods 704 may need to be orientated so that they align with the stress rods of the other optical fiber. Accordingly, the rotational offset may be used to determine the orientation of emission face 702, and specifically, the orientation of stress rods 704.

In some embodiments, the alignment offset may be compared with an alignment tolerance. If the alignment offset of emission face 702 is determined to be within an alignment tolerance, then emission face 702 may be released from the fiber alignment and splicing system. However, if the alignment offset of emission face 702 is not within the alignment tolerance, then emission face 702 may be rotated, or otherwise adjusted, to orient emission face 702 to a predetermined angular rotation. The alignment tolerance may vary depending on application. For example, in some applications, such as fusion splicing, the alignment tolerance may be small, thereby allowing minimal variation orientation of emission face 702. In other applications, the alignment tolerance may be larger, thereby allowing more flexibility with respect to the angular orientation of emission face 702.

When the alignment offset of emission face 702 is not within the alignment tolerance, emission face 702 may be rotated using the fiber alignment and splicing system illustrated and described with respect to FIG. 1. A rotation angle may be determined based on the rotational offset of emission face 702. The rotation angle may be the degree or amount of rotation necessary for vertical offset axis 750 to align with the vertical y-axis. In some cases, after rotating emission face 702 based on the degree of rotational offset, another emission image of emission face 702 may be generated.

Figure 7C:
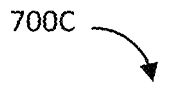
FIG. 7C is an exemplary emission image depicting the optical fiber of FIG. 7A after rotation to a target position to correct the rotational offset illustrated in FIG. 7A according to an embodiment of the present invention.
Figure 7C:
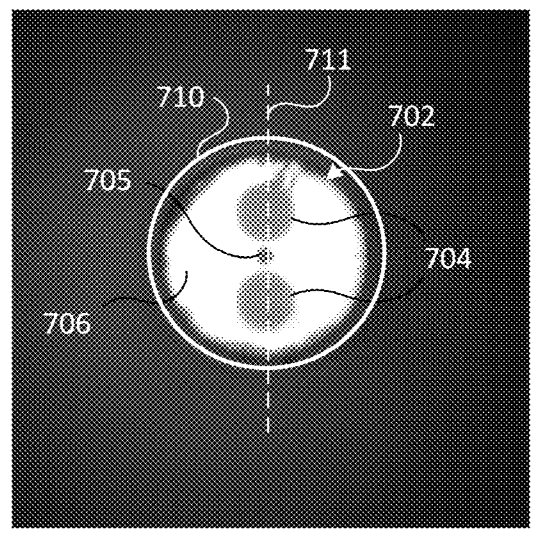

To facilitate adjusting the emission face 702 to an alignment offset within the alignment tolerance, a reference or target position may be identified. FIG. 7C is an exemplary emission image depicting the optical fiber of FIG. 7A after rotation to a target position 710 to correct the rotational offset illustrated in FIG. 7A according to an embodiment of the present invention. In FIG. 7C, an exemplary emission image 700C is shown depicting the optical fiber of FIG. 7A after rotation to correct the rotational offset using the fiber alignment and splicing system illustrated in FIG. 1. As shown in FIG. 7C, exemplary emission image 700C depicts emission face 702 of FIG. 7A after rotation to target position 710. Target position 710 can include an axis 711 that aligns core 705 and stress rods 704. Axis 711 may be the same as axis 701 except that it is rotated to a target, or corrected, degree. In this scenario, correcting the rotational offset of emission face 702 includes aligning axis 701 vertically along the y-axis. Similar to emission image 700A, emission image 700C depicts emission face 702 along with stress rods 704, core 705, and cladding 706. The orientation, however, of stress rods 704, core 705, and cladding 706 depicted in emission image 700C may be different than in emission image 700A. In particular, the emission image 700C demonstrates that axis 711 through stress rods 704 has been aligned with the y-axis.

Figure 7D:
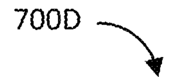
FIG. 7D is a diagram illustrating a computational image used to identify a target position for emission face of the optical fiber illustrated in FIG. 7A.
Figure 7D:
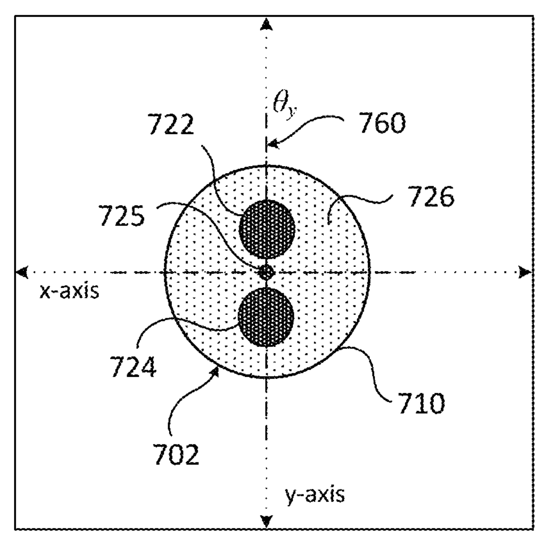

FIG. 7D is a diagram illustrating a computational image 700D used to identify target position 710 for emission face 702 illustrated in FIG. 7A. Computational image 700D may be generated based on computational image 700B. Specifically, computational image 700D may be generated based on first position 708. To generate computational image 700D, target position 710 may be identified. As noted above, target position 710 may include axis 711. Identifying target position 710 can include identifying axis 711 based on alignment with an external body. In some embodiments, the external body may be another optical fiber, such as for example, second optical fiber 102B. In such cases, axis 711 may be identified based on a corresponding axis and target position for second optical fiber 102B. In some examples, target position 710 may be identified based on pixels within emission image 700A. Such examples are discussed in greater detail with respect to FIGS. 8A-8D.

As shown, computational image 700D may include a first region 722 and a second region 724 that correspond to stress rods 704 in the rotated position. Computational image 700D may also include a core 725 and a cladding 726 corresponding to core 705 and cladding 706 in the rotated position. Unlike computational image 700B, computational image 700D may not have a vertical rotation offset, $\theta_y$, from first region 722 and second region 724. Instead, when the center of first region 722, second region 724, and core 725 are aligned to identify a vertical offset axis 760, vertical offset axis 760 aligns with the vertical y-axis. Axis 711, and thus target position 710, may be identified based on vertical offset axis 760. Accordingly, if determined, the vertical rotation offset, $\theta_y$, would be zero. While the above discussion relates to vertical alignment, i.e., aligning vertical offset axis 760 with the vertical y-axis, of the stress rods 704, stress rods 704 may be aligned in any other orientation.

While not shown, target position 710 may also be determined based on a translational offset of emission face 702. As noted above, in some embodiments, the alignment offset includes both the rotational offset of emission face 702 and a translational offset for emission face 702. While not shown, the translational offset for emission face 702 may be the degree to which emission face 702 is translated or positioned in an x-, y-, or z-direction, or in an a-, b-, or c-direction as discussed with respect to FIG. 5. For example, emission face 702 may have a rotational offset such that first region 712 and second region 714 are rotated such to not align with an external body. Emission face 702 may also have a translational offset such that the optical fiber corresponding to emission face 702 needs to be adjusted to move up, down, right, or left with respect to the external body.

The fiber alignment and splicing system, and related methods, described herein may also be used for other types of fibers and/or configuration of stress rods, patterned microstructures, elements, keying features, and cores of fibers. In various embodiments, the fiber alignment and splicing system may be another type of alignment system such as for bow-tie fibers, panda fibers, multi-core fibers, elliptical fibers, photonic crystal optical fibers, and the like.

Figures 8A, 8B:
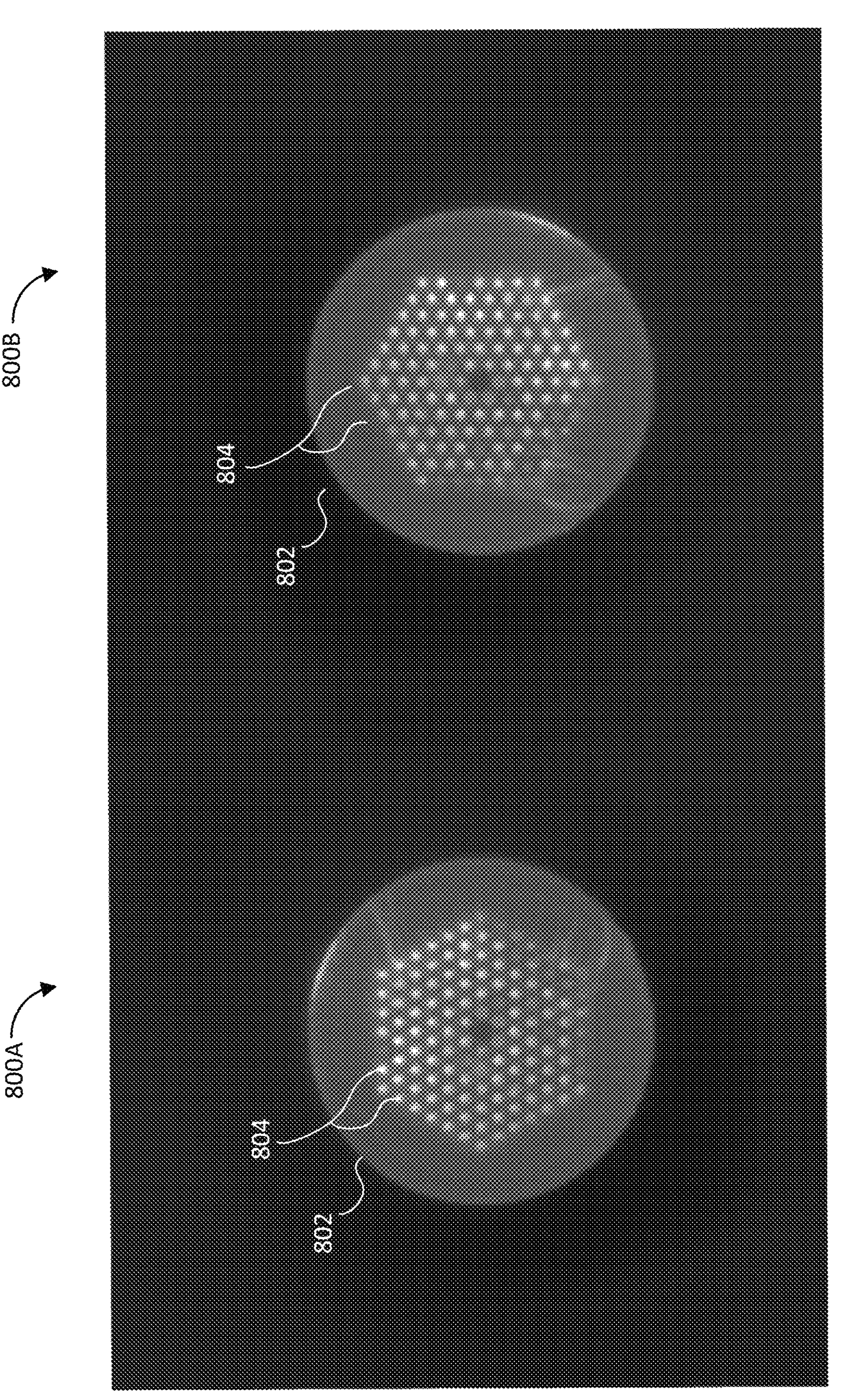
FIG. 8A is an image of a photonic crystal fiber end face obtained using the fiber alignment and splicing system illustrated in FIG. 1.
FIG. 8B is an image of the photonic crystal fiber end face after rotation to correct a rotational offset obtained using the fiber alignment and splicing system illustrated in FIG. 1.

FIG. 8A is an image of a photonic crystal fiber end face obtained using the fiber alignment and splicing system illustrated in FIG. 1. In FIG. 8A, image 800A illustrates the components of optical fiber 802 present at a plane defined by the emission face of optical fiber 802 before alignment using an fiber alignment and splicing system, such as fiber alignment and splicing system 100A of FIG. 1. The emission face of photonic crystal optical fiber 802 may have a rotational offset. Photonic crystal optical fiber 802 may be rotated using a fiber alignment and splicing system based on the rotational offset and, after rotation of the photonic crystal optical fiber 802, an image 800B of an emission face of the photonic crystal optical fiber 802 may be generated.

FIG. 8B is an image of the photonic crystal fiber end face after rotation to correct a rotational offset using the fiber alignment and splicing system illustrated in FIG. 1. Although, photonic crystal optical fiber 802 does not contain any stress rods, the presence of a patterned microstructure formed by multiple cores 804 enables a similar technique for determining a rotational offset for photonic crystal optical fiber 802 to be used as described above with relation to FIGS. 6A, 6B, and 7A-7D. Then, based on the rotational offset, a rotation angle may be determined for photonic crystal optical fiber 802. Thus, image 800B depicts the emission face of photonic crystal optical fiber 802 after rotating photonic crystal optical fiber 802 by the rotation angle. In the embodiment illustrated in FIGS. 8A and 8B, the rotation angle was approximately 30 degrees.

As noted above, an optical fiber may be aligned with an external body. For example, fiber alignment and splicing system may be used to align a first optical fiber with a second optical fiber. For example, to align a first optical fiber with a second optical fiber it may be necessary to align the stress rods of each optical fiber. Once aligned, in some embodiments, the fiber alignment and splicing system may be used to splice the first optical fiber and the second optical fiber together.

Figures 9A, 9B, 9C, 9D:
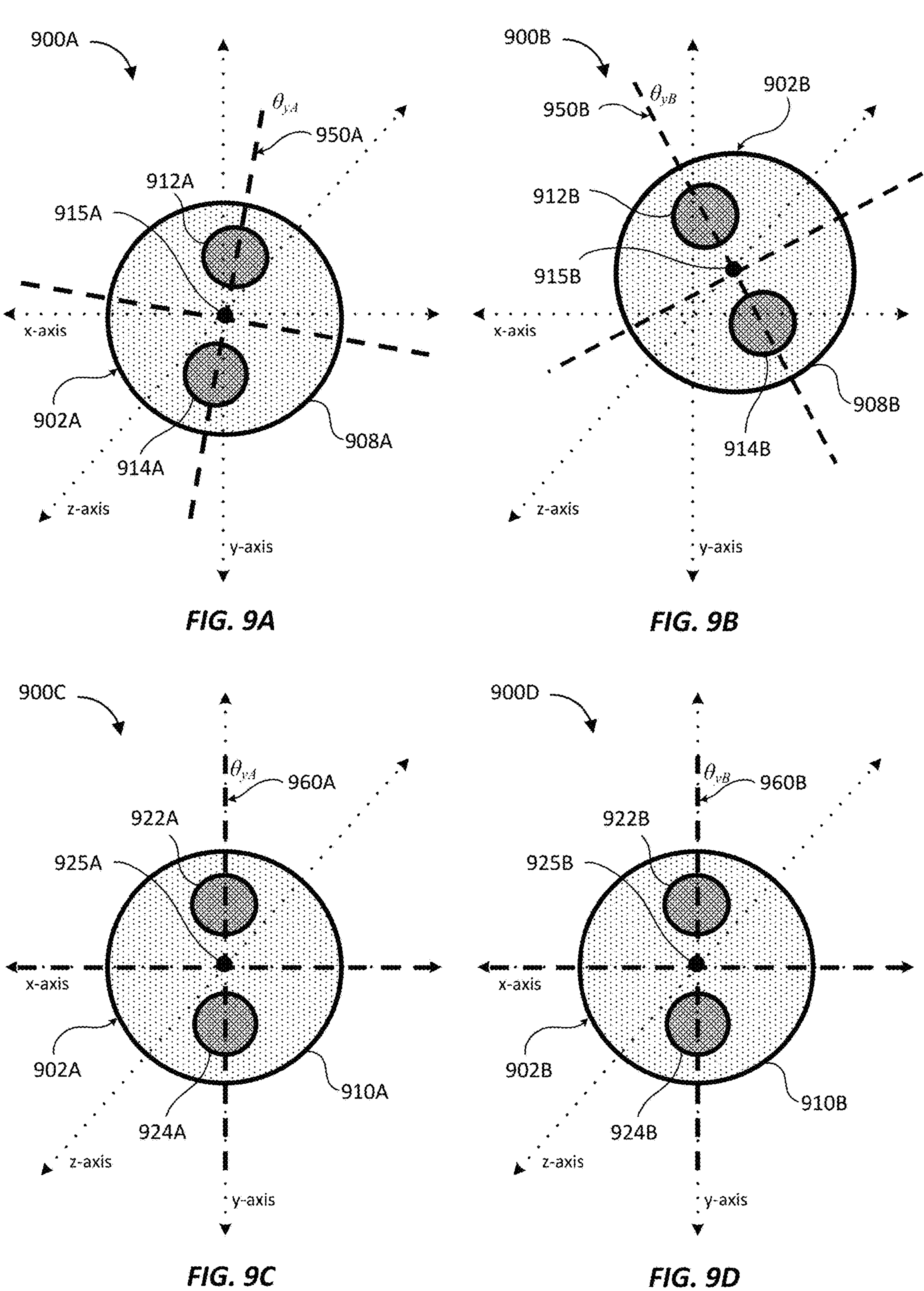
FIG. 9A is a diagram illustrating a first position of an emission face of a first fiber obtained using the fiber alignment and splicing system illustrated in FIG. 1.
FIG. 9B is a diagram illustrating a second position of an emission face of a second fiber obtained using the fiber alignment and splicing system illustrated in FIG. 1.
FIG. 9C is a diagram illustrating a first target position of the emission face of the first fiber obtained using the fiber alignment and splicing system illustrated in FIG. 1.
FIG. 9D is a diagram illustrating a second target position of the emission face of the second fiber obtained using the fiber alignment and splicing system illustrated in FIG. 1.

FIG. 9A is a diagram illustrating a first position of an emission face of a first fiber obtained using the fiber alignment and splicing system illustrated in FIG. 1. FIG. 9B is a diagram illustrating a second position of an emission face of a second fiber obtained using the fiber alignment and splicing system illustrated in FIG. 1. FIG. 9C is a diagram illustrating a first target position of the emission face of the first fiber obtained using the fiber alignment and splicing system illustrated in FIG. 1. FIG. 9D is a diagram illustrating a second target position of the emission face of the second fiber obtained using the fiber alignment and splicing system illustrated in FIG. 1. As discussed more fully below, a series of computational images 900A-900D can be used during alignment of a first optical fiber, such as first optical fiber 102A, with a second optical fiber, such as second optical fiber 102B using the fiber alignment and splicing system illustrated in FIG. 1.

Referring to FIG. 9A, computational image 900A may be generated based off of an initial image generated of a first emission face 902A of a first optical fiber, such as first optical fiber 102A. Similarly, as illustrated in FIG. 9B, computational image 900B may be generated based off the initial image generated of a second emission face 902B of a second optical fiber, such as second optical fiber 102B. Computational image 900A and computation image 900B may be generated from the same initial image. In other words, a single initial image may generate both first emission face 902A and second emission face 902B. Image processing techniques can be utilized to process a sub-image of the first emission face 902A and a sub-image of the second emission face 902B.

To generate computational image 900A, a first region 912A, a second region 914A, and a first central region 915A may be identified. First region 912A and second region 914A may correspond to the stress rods of first optical fiber 902A and first central region 915A may correspond to the core of first optical fiber 902A. Once first region 912A and second region 914A are identified, vertical and horizontal x-y coordinates for first region 912A and second region 914A as well as first central region 915A may be determined. Based on first region 912A, second region 914A, and central region 915A, a first position 908A may be identified for first emission face 902A.

To generate computational image 900B, a third region 912B, a fourth region 914B, and a second central region 915B may be identified. Third region 912B and fourth region 914B may correspond to the stress rods of second emission face 902B and second central region 915B may correspond to the core of second emission face 902B. Once third region 912B and fourth region 914B are identified, vertical and horizontal x-y coordinates for third region 912B and fourth region 914B as well as second central region 915B may be determined. Based on third region 912B, fourth region 914B, and second central region 915B, a second position 908B may be identified for second emission face 902B.

A first target position 910A for first emission face 902A and a second target position 910B for second emission face 902B may be determined based on the identified first position 908A and identified second position 908B. For example, first target position 910A and second target position 910B may be determined using an overall alignment offset for first emission face 902A and second emission face 902B. The overall alignment offset may be based on a first alignment offset for first emission face 902A and a second alignment offset for second emission face 902B. The alignment offset may be a measurement of the misalignment of first emission face 902A and second emission face 902B.

In particular, first target position 910A may be determined based on the first alignment offset and second target position 910B may be determined based on the second alignment offset. The first alignment offset may include a first rotational offset of first emission face 902A. Similarly, the second alignment offset may include a second rotational offset of second emission face 902B. The first rotational offset and the second rotational offset of emission faces 902A and 902B may be based on a first degree of rotational offset and a second degree of rotational offset, respectively. As described above with relation to FIGS. 7A-D, the first degree of rotational offset may be calculated for first region 912A and second region 914A, and the second degree of rotational offset may be calculated for third region 912B and fourth region 914B. To calculate the first degree of rotational offset, a first vertical rotation offset, $\theta_{yA}$, may be determined, from both first region 912A and second region 914A. Similarly, a second vertical rotation offset, $\theta_{yB}$, may be determined from both third region 912B and fourth region 914B. A first vertical offset axis 950A may be determined based on the first vertical rotation offset, $\theta_{yA}$ and a second vertical offset axis 950B may be determined based on second vertical rotation offset, $\theta_{yB}$. Using the first rotation offset, $\theta_{yA}$, and second rotation offset vertical, $\theta_{yB}$, the first degree and the second degree of rotational offset may be determined for first region 912A and second region 914A, and third region 912B and fourth region 914B, respectively.

In some embodiments, the first alignment offset and the second alignment offset may include a first translational offset and a second translational offset, respectively. The first translational offset and the second translational offset may be the degree to which first emission face 902A and second emission face 902B are translated or misaligned along the z-axis. As depicted in FIGS. 9A and 9B, first emission face 902A may have a minimal, or even non-existent, first translational offset, while second emission face 902B may have a second translational offset. Accordingly, first emission face 902A may not need to be translated to fix the first translational offset while second emission face 902B may require translation (i.e., to be adjusted to move up, down, right, or left) to fix the second translational offset.

As illustrated by FIG. 9C, based on the first degree of rotational offset for first region 912A, second region 914A, and first central region 915A from FIG. 9A, a target first region 922A, a target second region 924A, and a target first central region 925A can be determined. Similarly, as illustrated by FIG. 9D, based on the second degree of rotational offset of third region 912B, fourth region 914B, and second central region 915B from FIG. 9B, a target third region 922B, a target fourth region 924B, and a target second central region 925B can be determined. These target regions illustrate the positions of the corresponding stress rods and cores of first emission face 902A and second emission face 902B if the respective optical fibers were rotated to the target positions 910A and 910B.

Using first region 922A and second region 924A, first target position 910A can be determined. Specifically, a target first vertical offset axis 960A may be determined. Similarly, using third region 922B and fourth region 924B, a target second vertical offset axis 960B may be determined, thereby identifying second target position 910B. As shown, target first vertical offset axis 960A may align with the vertical y-axis. Accordingly, first emission face 902A after adjustment may have an adjusted first vertical rotation offset, $\theta_{yA}$ of zero. Second emission face 902B may also have an adjusted second vertical rotation offset, $\theta_{yB}$, of zero. Accordingly, first emission face 902A and second emission face 902B may be aligned. To verify alignment, an adjusted alignment offset may be calculated for computational images 900C and 900D, as described above. If the adjusted alignment offset is within the alignment tolerance, then first emission face 902A and second emission face 902B may be released from the fiber alignment and splicing system. In other embodiments, if the adjusted alignment offset is within the alignment tolerance, then the fiber alignment and splicing system may splice first emission face 902A and second emission face 902B together.

In some embodiments, first target position 910A and second target position 910B are determined based off of pixels within the initial image used to generate computational image 900A and computational image 900B. For example, the pixel coordinates of first central region 915A of first emission face 902A may be determined and the pixel coordinates of second central region 915B of second emission face 902B may be determined. First central region 915A may be identified as a first central point of first position 908A and second central region 915B may be identified as a second central point of second position 908B. A distance between the first central point of first position 908A and the second central point of second position 908B may be determined. Then, based on the distance between the first central point and the second central point, first target position 910A and second target position 910B may be determined. As shown, first target position 910A and second target position 910B may be determined by aligning the first central point and the second central point at the origin point of computational images 900C and 900D. Depending on the alignment scenario, first emission face 902A may be aligned with second emission face 902B, second emission face 902B may be aligned with first emission face 902A, or first emission face 902A and second emission face 902B may be both adjusted into alignment with each other. Depending on the scenario, first target position 910A and second target position 910B may be identified.

After first target position 910A and second target position 910B are identified, one or both of the first optical fiber and the second optical fiber may be adjusted to a modified position. The modified position may be the position of first optical fiber and second optical fiber such that first emission face 902A is at first target position 910A and second emission face 902B is at second target position 910B. As discussed above, adjusting the position of the first optical fiber and/or second optical fiber may include rotating and/or translating the fibers using the fiber alignment and splicing system as discussed herein.

Figure 10A:
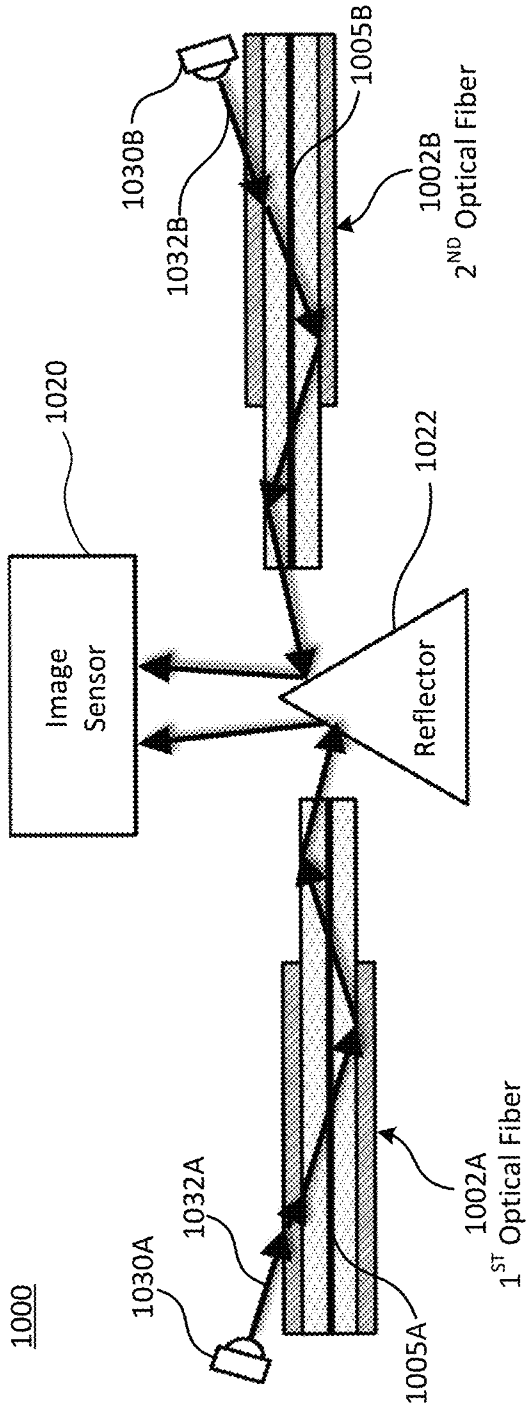
FIG. 10A is a simplified schematic diagram illustrating the components of the fiber alignment and splicing system prior to alignment of a first fiber and a second fiber according to an embodiment of the present invention.

FIG. 10A is a simplified schematic diagram illustrating the components of the fiber alignment and splicing system prior to alignment of a first fiber and a second fiber according to an embodiment of the present invention. As described in relation to FIGS. 10A-C, two optical fibers can be aligned and spliced using the fiber alignment and splicing system 1000 illustrated herein. As illustrated in FIG. 10A, a first optical fiber 1002A and a second optical fiber 1002B are provided. Fiber alignment and splicing system 1000 may be the same or similar to fiber alignment and splicing system 100 in FIG. 1. Although not shown, it is understood that first optical fiber 1002A and second optical fiber 1002B are disposed within a first rotation stage and a second rotation stage, respectively. First optical fiber 1002A and second optical fiber 1002B may have a first core 1005A and a second core 1005B, respectively.

A first light source 1030A may be positioned to emit light 1032A onto first optical fiber 1002A. Similarly, a second light source 1030B may be positioned to emit light 1032B onto second optical fiber 1002B. Light 1032A emitted onto first optical fiber 1002A may enter and propagate through first optical fiber 1002A. Similarly, light 1032B may enter and propagate through second optical fiber 1002B. A first emission face of first optical fiber 1002A and a second emission face of second optical fiber 1002B may be positioned adjacent to a reflector 1022. Reflector 1022 may redirect light emitting from first optical fiber 1002A and second optical fiber 1002B via the first emission face and the second emission face, respectively, to an image sensor 1020. Image sensor 1020 may generate an initial image of the first emission face of first optical fiber 1002A and the second emission face of second optical fiber 1002B as illustrated in FIG. 10A.

An alignment offset for first optical fiber 1002A and second optical fiber 1002B may be determined based on the initial image generated as illustrated in FIG. 10A. Based on the alignment offset, first optical fiber 1002A and second optical fiber 1002B may be adjusted. After first optical fiber 1002A and second optical fiber 1002B are adjusted, an additional image of the first emission face and the second emission face may be generated. An adjusted alignment offset may be determined based on the additional image. If the adjusted alignment offset is within an alignment tolerance, then the first optical fiber 1002A and second optical fiber 1002B may be spliced together. Otherwise, the alignment adjustment process may be repeated until the alignment tolerance is achieved. In addition to rotational alignment, the alignment adjustment process can also include translation of either or both of first optical fiber 1002A and second optical fiber 1002B prior to splicing.

Figures 10B, 10C:
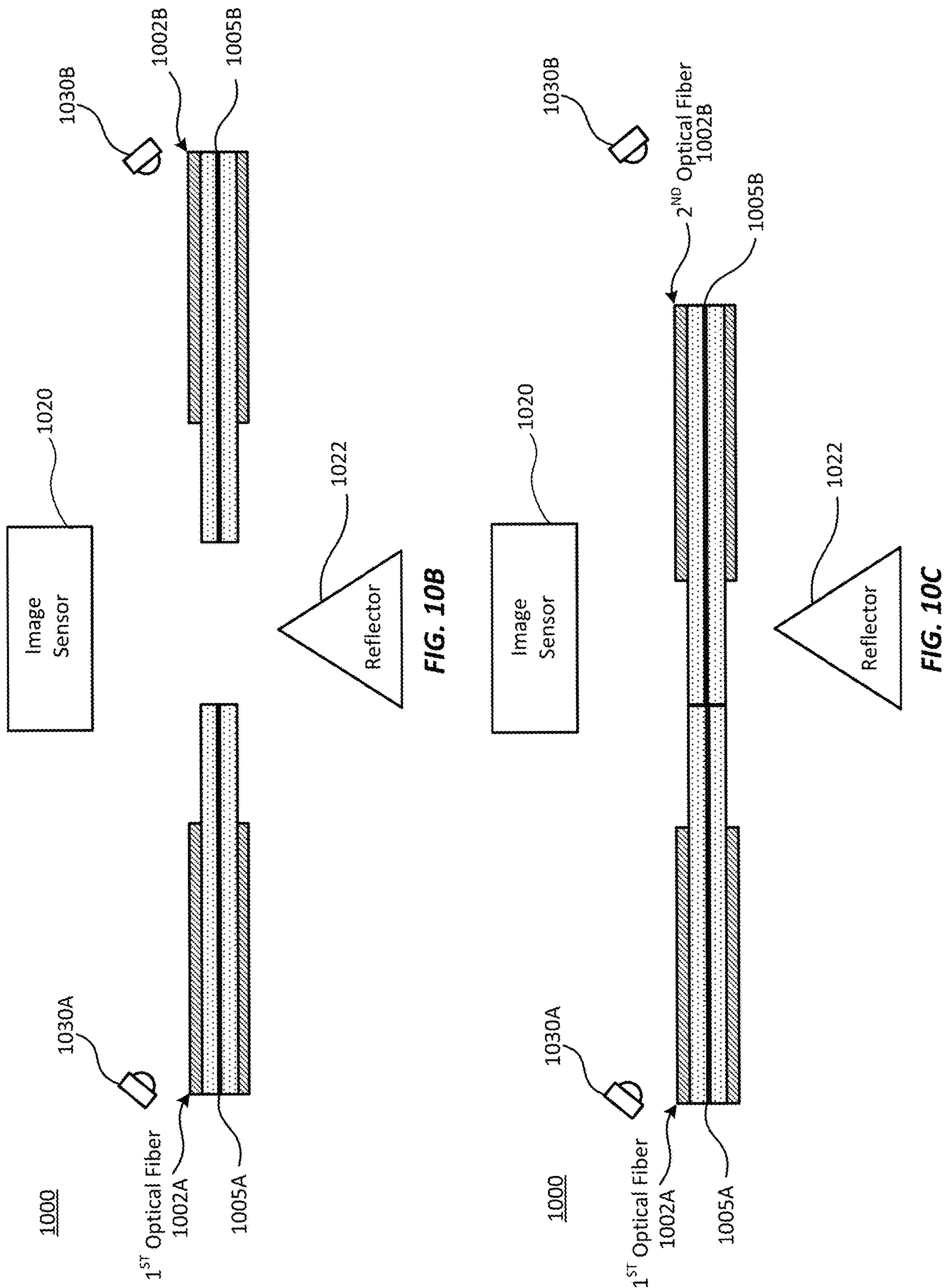
FIG. 10B is a simplified schematic diagram illustrating the components of the fiber alignment and splicing system after alignment of the first fiber and second fiber and prior to contacting the first fiber and the second fiber according to an embodiment of the present invention.
FIG. 10C is a simplified schematic diagram illustrating the components of the fiber alignment and splicing system after the first fiber and the second fiber are brought into physical contact according to an embodiment of the present invention.

FIG. 10B is a simplified schematic diagram illustrating the components of the fiber alignment and splicing system after alignment of the first optical fiber 1002A and second optical fiber 1002B and prior to contacting the first optical fiber 1002A and the second optical fiber 1002B according to an embodiment of the present invention. As illustrated in FIG. 10B, reflector 1022 may be removed from the initial position disposed between first optical fiber 1002A and second optical fiber 1002B.

FIG. 10C is a simplified schematic diagram illustrating the components of the fiber alignment and splicing system after the first optical fiber 1002A and the second optical fiber 1002B are brought into physical contact according to an embodiment of the present invention. As illustrated in FIG. 10C, first optical fiber 1002A and second optical fiber 1002B have been joined together at their emission faces and spliced using one of several suitable fiber splicing processes. Thus, utilizing embodiments of the present invention, rotational alignment processes can be utilized to align polarization maintaining fibers so that the polarization state of light propagating in the polarization maintaining fibers can be maintained during propagation despite the presence of the fiber splice.

Figure 11:
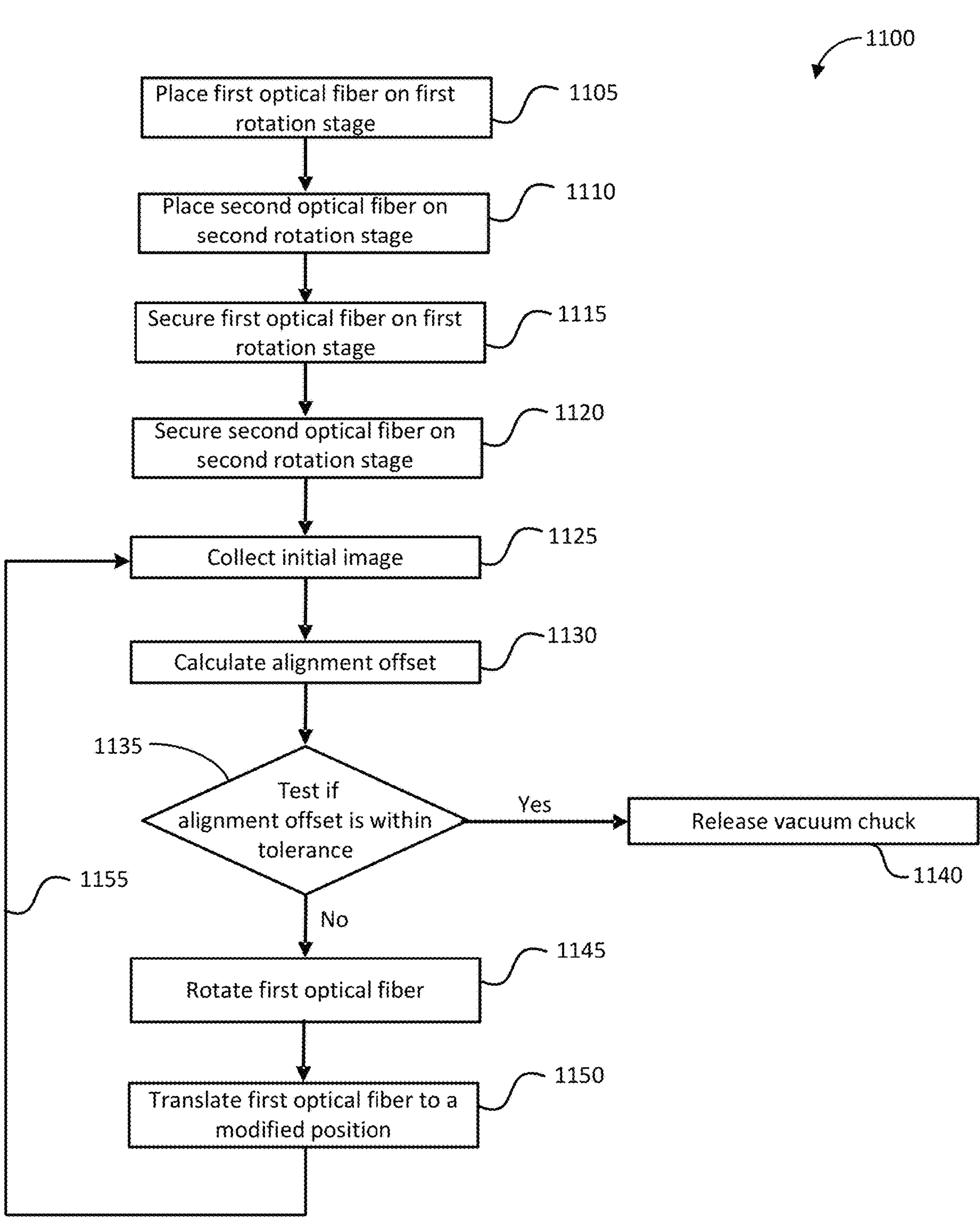
FIG. 11 is a simplified flowchart illustrating a method of aligning a set of fibers according to an embodiment of the present invention.

FIG. 11 is a simplified flowchart illustrating a method 1100 of aligning a set of fibers according to an embodiment of the present invention. For ease of discussion, method 1100 is described with reference to elements of FIGS. 1, 2, 5, 6A-B, 7A-D, 8A-B, and 9A-D, however, it will be appreciated that the use of method 1100 is not limited to the particular fiber alignment and splicing system illustrated in FIGS. 1, 2, 5, 6A-B, 7A-D, 8A-B, and 9A-D.

The method includes placing a first optical fiber on a first rotation stage (1105). The method also includes placing a second optical fiber on a second rotation stage (1110). For example, with reference to FIG. 1, a first optical fiber 102A may be placed on a first rotation stage 110A and a second optical fiber 102B may be placed on a second rotation stage 110B. In some embodiments, first optical fiber 102A may be disposed in a first optical fiber channel 109A and second optical fiber 102B may be disposed in a second optical fiber channel 109B.

The method includes securing the first optical fiber on the first rotation stage (1115) and securing the second optical fiber on the second rotation stage (1120). In some embodiments, securing the first optical fiber on the first rotation stage may include contacting the first optical fiber with a vacuum chuck and inducing a vacuum on the first optical fiber using the vacuum chuck. In other embodiments, securing the second optical fiber on the second rotation stage may include contacting the second optical fiber with a vacuum chuck and inducing a vacuum on the second optical fiber using the vacuum chuck. For example, with reference to FIG. 2, optical fiber 202 may be secured onto rotation stage 210 by contacting a portion 213 of optical fiber 202 with static immobilizer 212 being a vacuum chuck. Optical fiber 202 may be either the first optical fiber or the second optical fiber.

The method includes collecting an initial image of a first emission face of the first optical fiber and a second emission face of the second optical fiber (1125). With reference to FIG. 1, an initial image of a first emission face of first optical fiber 102A and a second emission face of second optical fiber 102B may be collected using an image sensor 120.

The method also includes calculating an alignment offset based on the initial image (1130). In some embodiments, calculating the alignment offset based on the initial image may include determining a first alignment offset for the first optical fiber and determining a second alignment offset for the second optical fiber.

In some embodiments, calculating the alignment offset based on the initial image may include determining a rotational offset based on the initial image and determining a translational offset based on the initial image. Determining the rotational offset based on the initial image according to the method may include identifying a first region and a second region in the initial image of the first emission face, identifying a third region and a fourth region in the initial image of the second emission face, calculating a first degree of rotational offset of the first optical fiber based on the first region and the second region, calculating a second degree of rotational offset of the second optical fiber based on the third region and the fourth region, and calculating the rotational offset based on the first degree of rotational offset and the second degree of rotational offset.

The method includes testing if the alignment offset is within a tolerance (1135). The method also includes determining that the alignment offset is within the tolerance and releasing the first optical fiber from the first rotation stage (1140). In some embodiments, the method further includes removing equipment disposed between the first optical fiber and the second optical fibers, and contacting the first emission face of the first optical fiber with the second emission face of the second optical fiber. For example, with reference to FIG. 1, the method may include removing reflector 122 positioned between first optical fiber 102A and second optical fiber 102B, and contacting the first emission face of first optical fiber 102A with the second emission face of second optical fiber 102B. In some embodiments, the method may further include splicing the first emission face of the first optical fiber to the second emission face of the second optical fiber. For example, referring to FIG. 1, the first emission face of first optical fiber 102A may be spliced to the second emission face of second optical fiber 102B.

The method may include rotating the first optical fiber to a modified position if the alignment offset is not within a tolerance (1145). In some embodiments, the method may include determining the alignment offset is not within the tolerance, after determining that the alignment offset is not within the tolerance, releasing the first optical fiber, and after rotating the first optical fiber to the modified position, securing the first optical fiber on the first rotation stage in the modified position. For example, with reference to FIG. 2, the method may include determining that optical fiber 202 is not within a tolerance and releasing optical fiber 202. Releasing optical fiber 202 may include releasing portion 213 of optical fiber 202 from static immobilizer 212. For example, if static immobilizer 212 is a vacuum chuck, releasing optical fiber 202 may include releasing the vacuum applied by static immobilizer 212 to optical fiber 202. After releasing optical fiber 202, rotation stage 210 may rotate optical fiber 202 to a modified position.

In some embodiments, the method also includes after determining the alignment offset is not within the tolerance, closing a mechanical immobilizer about the first optical fiber to immobilize the first optical fiber and after rotating the first optical fiber to the modified position, opening the mechanical immobilizer about the first optical fiber to release the first optical fiber. With reference to FIG. 2, mechanical immobilizer 218 may be closed around a portion 207 of optical fiber 202, for example, before rotating optical fiber 202 on rotation stage 210. Rotation stage 210 may then rotate optical fiber 202 to the modified position. After rotating optical fiber 202 to the modified position, mechanical immobilizer 218 may open to release optical fiber 202.

The method may also include translating the first optical fiber based on the translational offset of the first optical fiber if the alignment offset is not within the tolerance (1050). For example, with reference to FIG. 5, the translation stage 550 of fiber alignment and splicing system 500 may translate optical fiber 502 based on the translational offset. The first optical fiber may be translated to the modified position.

In some embodiments, one of rotating the first optical fiber (1145) and translating the first optical fiber (1150) may be omitted. In other embodiments, rotating the first optical fiber (1145) and translating the first optical fiber (1150) may be performed simultaneously or concurrently in a single step.

The method also includes collecting at least one more additional image of the first emission face of the first optical fiber and the second emission face of the second optical fiber (1155). For example, with reference to FIG. 1, the method may include iteratively collecting at least one additional image of the first emission face of first optical fiber 102A and the second emission face of second optical fiber 102B. In some cases, the elements of the method may iteratively repeat, collecting a new image at each iteration, until the alignment offset of first optical fiber 102A and second optical fiber 102B is within the alignment tolerance.

It should be appreciated that the specific steps illustrated in FIG. 11 provide a particular method of 1100 according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
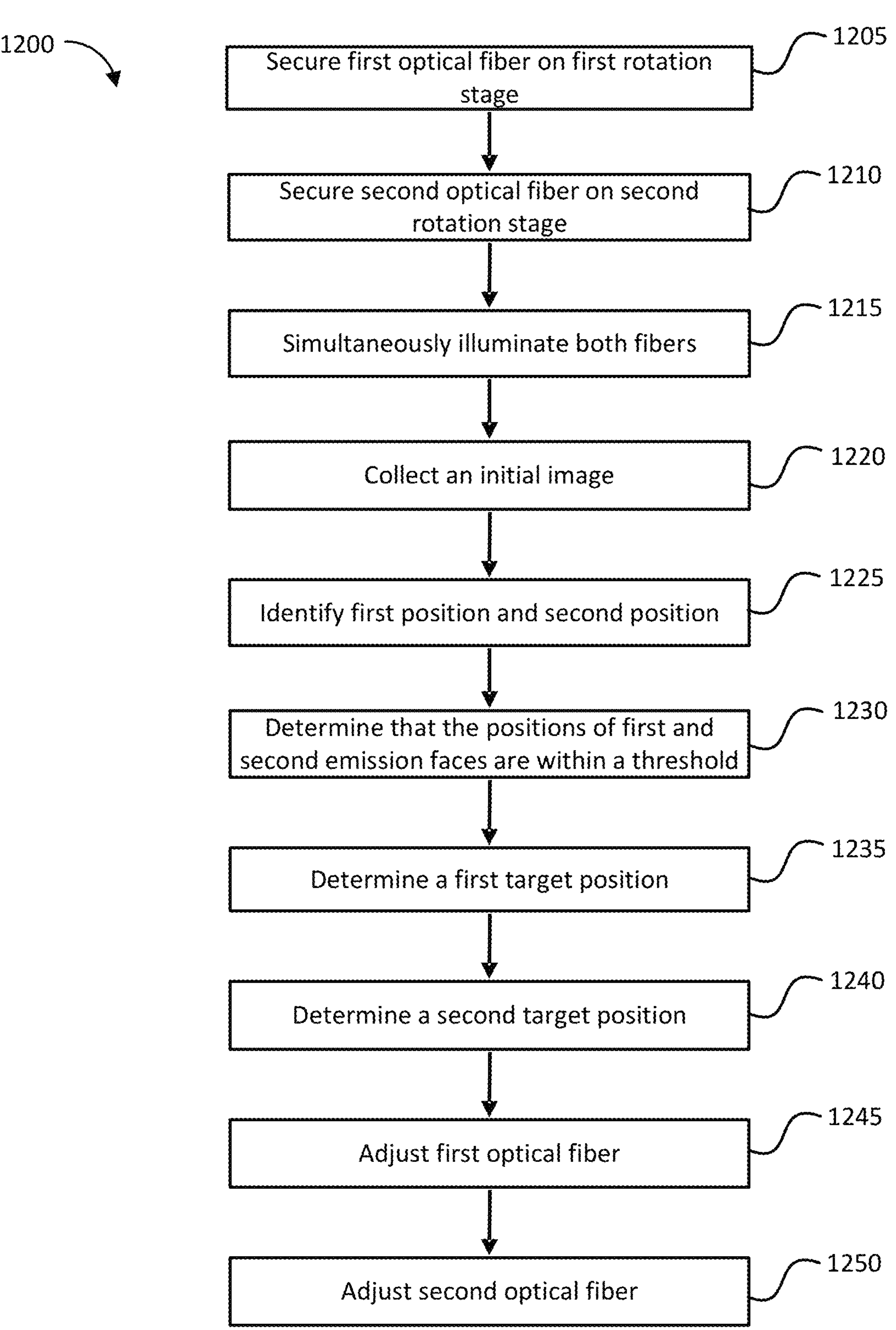
FIG. 12 is a simplified flowchart illustrating a method of aligning a set of fibers according to an embodiment of the present invention.

FIG. 12 is a simplified flowchart illustrating a method 1200 of aligning a set of fibers according to an embodiment of the present invention. For ease of discussion, method 1200 is described with reference to elements of FIGS. 1 and 2, however, it will be appreciated that the use of method 1200 is not limited to the particular fiber alignment and splicing system illustrated in FIGS. 1 and 2.

The method includes securing a first optical fiber on a first rotation stage (1205). The method also includes securing a second optical fiber on a second rotation stage (1210). In some embodiments, securing the first optical fiber on the first rotation stage may include contacting the first optical fiber with a vacuum chuck and inducing a vacuum on the first optical fiber using the vacuum chuck. In other embodiments, securing the second optical fiber on the second rotation stage may include contacting the second optical fiber with a vacuum chuck and inducing a vacuum on the second optical fiber using the vacuum chuck. For example, with reference to FIG. 2, optical fiber 202 may be secured onto rotation stage 210 by contacting a portion 213 of optical fiber 202 with static immobilizer 212 being a vacuum chuck. Optical fiber 202 may be either the first optical fiber or the second optical fiber.

The method includes simultaneously or concurrently illuminating the first optical fiber and the second optical fiber (1215). With reference to FIG. 1, first light source 130A and second light source 130B may simultaneously or concurrently illuminate first optical fiber 102A and second optical fiber 102B.

The method includes collecting an initial image of a first emission face of the first optical fiber and a second emission face of the second optical fiber (1220). With reference to FIG. 1, an initial image of a first emission face of first optical fiber 102A and a second emission face of second optical fiber 102B may be collected using an image sensor 120. Image sensor 120 may generate the initial image depicting both emission faces without repositioning.

The method also includes identifying a first position of the first emission face and a second position of the second emission face (1225). In some embodiments, identifying the first position and the second position include determining a first center point of the first emission face based on the initial image and determining a second center point of the second emission face based on the initial image.

The method also includes determining that the first position of the first emission face and the second position of the second emission face are within a first threshold area (1230). If it is determined that the first position of the first optical fiber is not within the first threshold area, then the method may further include adjusting the position of the first optical fiber such that the first position is within the first threshold area. Similarly, if the second position of the second optical fiber is not within a second threshold area, then the method may further include adjusting the second optical fiber such that the second position is within the second threshold area. Adjusting either or both of the first optical fiber and the second optical fiber may include translating and/or rotating the optical fiber as discussed herein.

The method may also include determining, based on the first position, a first target position for the first emission face (1235). Similarly, the method may also include determining, based on the second position, a second target position for the second emission face (1240). In some embodiments, determining, based on the first position, the first target position for the first emission face may include identifying a first center point of the first position, identifying a second center point of the second position, determining a distance between the first center point and the second center point, and determining the first target position based on the distance between the first center point and the second center point. In some embodiments, the second target position may be similarly determined. For example, determining, based on the second position, the second target position of the second emission face may include determining the second target position based on the distance between the first center point and the second center point.

The method may also include adjusting the position of first emission face of the first optical fiber to the first target position (1245). Similarly, the method may include adjusting the position of the second emission face of the second optical fiber to the second target position (1250). Adjusting the position of the first emission face of the first optical fiber to the first target position may include one or both of rotating the position of the first emission face of the first optical fiber to the first target position or translating the position of the first emission face of the first optical fiber to the first target position. Similarly, adjusting the position of the second emission face to the second optical fiber to the second target position may include one or both of rotating the position of the second emission face of the second optical fiber to the second target position or translating the position of the second emission face of the second optical fiber to the second position. In some embodiments, both positions of the first emission face and the second emission face may be simultaneously or concurrently adjusted to the first target position and second target position, respectively.

In some embodiments, the method further includes removing equipment disposed between the first optical fiber and the second optical fibers, and contacting the first emission face of the first optical fiber with the second emission face of the second optical fiber. For example, with reference to FIG. 1, the method may include removing reflector 122 positioned between first optical fiber 102A and second optical fiber 102B and contacting the first emission face of first optical fiber 102A with the second emission face of second optical fiber 102B. In some embodiments, the method may further include splicing the first emission face of the first optical fiber to the second emission face of the second optical fiber. For example, referring to FIG. 1, the first emission face of first optical fiber 102A may be spliced to the second emission face of second optical fiber 102B.

It should be appreciated that the specific steps illustrated in FIG. 12 provide a particular method of aligning a set of fibers according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 13:
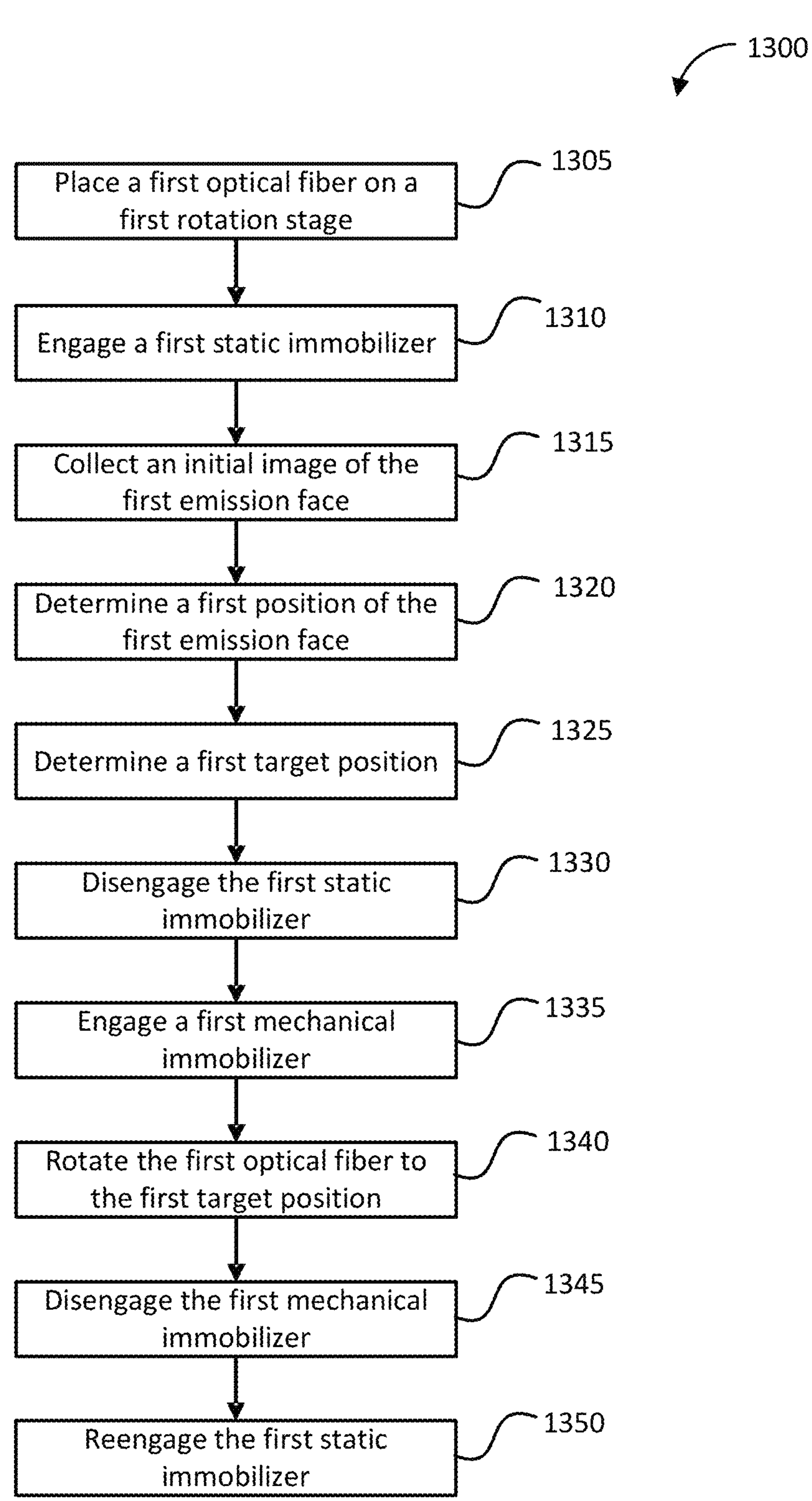
FIG. 13 is a simplified flowchart illustrating a method of aligning an optical fiber according to an embodiment of the present invention.

FIG. 13 is a simplified flowchart illustrating a method 1300 of aligning an optical fiber according to an embodiment of the present invention. For ease of discussion, method 1300 is described with reference to elements of FIGS. 1 and 2, however, it will be appreciated that the use of method 1300 is not limited to the particular fiber alignment and splicing system illustrated in FIGS. 1 and 2.

The method includes placing a first optical fiber on a first rotation stage (1305). For example, optical fiber 202 may be placed on rotation stage 210, as described with respect to FIG. 2. The method also includes engaging a first static immobilizer to secure the first optical fiber on the first rotation stage (1310). With reference to FIG. 2, a portion 213 of optical fiber 202 may be contacted by static immobilizer 212 and when engaged, static immobilizer 212 may secure portion 213 of optical fiber 202 in place. In some embodiments, the first static immobilizer may be a vacuum chuck and engaging the first static immobilizer may include inducing a vacuum on the first optical fiber using the vacuum chuck.

The method includes collecting an initial image of a first emission face of the first optical fiber (1315). With reference to FIG. 2, an initial image of a first emission face of first optical fiber 202 may be collected using image sensor 220.

The method also includes determining, based on the initial image, a first position of the first emission face (1320). Based on the first position, a first target position for the first emission face may be determined (1325). The method includes disengaging the first static immobilizer to release the first optical fiber (1330). As noted above, the first static immobilizer may be a vacuum chuck and disengaging the first static immobilizer may include releasing the vacuum applied to the first optical fiber by the vacuum chuck.

The method also includes engaging a first mechanical immobilizer to secure the first optical fiber during rotation (1335). For example, with reference to FIG. 2, mechanical immobilizer 218 may contact portion 207 of optical fiber 202 to secure optical fiber 202 for rotation. In some embodiments, the first mechanical immobilizer may be engaged (1335) prior to disengagement of the first static immobilizer (1330). In other embodiments, the first mechanical immobilizer may be engaged (1335) simultaneously or concurrently with disengagement of the first static immobilizer (1330) in a single step.

Once the first mechanical immobilizer is engaged, the first optical fiber may be rotated to the first target position (1340). With reference to FIG. 2, optical fiber 202 may be rotated using rotator assembly 214. Once the first optical fiber is rotated to the first target position, the method may also include disengaging the first mechanical immobilizer to release the first optical fiber (1345).

Optionally, the method may include reengaging the first static immobilizer (1350). In some embodiments, the first optical fiber may be further rotated to a second target position and thus the first static immobilizer may be reengaged before rotating the first optical fiber to the second target position.

In other embodiments, rotation of the first optical fiber to the first target position may require an intermediate position placement of the first optical fiber. For example, the rotational offset of the first optical fiber may require rotation of 180°. To achieve rotation of 180°, the first optical fiber may be rotated 90° in a first step to an intermediate position. Once at intermediate position, the first mechanical immobilizer may disengage (1345) and the first static immobilizer (1350) may reengage. The rotation assembly may adjust back to a neutral position before reengaging the first mechanical immobilizer and disengaging the first static immobilizer for rotating the first optical fiber the additional 90° in a second step to the first target position to achieve the full 180° of rotation. In some embodiments, the rotation stage 210 may be pre-rotated while the optical fiber 202 is immobilized and then rotate the optical fiber 202 to the desired rotation angle such that rotation greater than 90° is achieved in a single step. As will be evident to one of skill in the art, the rotation step size does not need to be 90° and smaller step sizes may be utilized. Moreover, although two equal steps sizes of 90° are utilized in this example, this is not required and the step sizes may be unequal, summing to the desired total rotation angle. One of ordinary skill in the art would recognize many variations, modifications, and alternatives.

Embodiments of the present invention provide for accurate control of the orientation of the longitudinal axis of the optical fiber through the use of the first static immobilizer. As an example, after the first optical fiber is rotated to the first target position and the first mechanical immobilizer is disengaged to release the first optical fiber, the first static immobilizer can be reengaged, for example, by pulling a vacuum to position the first optical fiber in a v-groove extending along the length of the first static immobilizer. Accordingly, after rotation, the longitudinal axis of the first optical fiber is returned to the same position at which it was located prior to rotation.

In other embodiments, the method may further include placing a second optical fiber on a second rotation stage, engaging a second static immobilizer to secure the second optical fiber on the second rotation stage, collecting the initial image, wherein the initial image comprises the first emission face of the first optical fiber and the second emission face of the second optical fiber, determining, based on the initial image, a second position of the second emission face, determining a second target position for the second emission face, disengaging the second static immobilizer to release the second optical fiber, engaging a second mechanical immobilizer to secure the second optical fiber during rotation, rotating the second optical fiber to the second target position, and disengaging the second mechanical immobilizer to release the second optical fiber.

In some embodiments, the method may further include engaging the first static immobilizer to secure the first optical fiber after rotation, collecting a second image of the first emission face, and determining a modified position of the first emission face. Optionally, the method may include determining that the modified position of the first emission face is within a threshold area of the first target position, and disengaging the first static immobilizer to release the first optical fiber.

It should be appreciated that the specific steps illustrated in FIG. 13 provide a particular method of aligning an optical fiber according to an embodiment of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

The examples and embodiments described herein are for illustrative purposes only. Various modifications or changes in light thereof will be apparent to persons skilled in the art. These are to be included within the spirit and purview of this application, and the scope of the appended claims, which follow.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is an optical fiber alignment and splicing system comprising: a first rotation stage comprising a first central axis, a first end, and a second end, wherein the first central axis extends from the first end to the second end of the first rotation stage, wherein the first rotation stage: further comprises a first optical fiber channel, wherein the first optical fiber channel extends from the first end of the first rotation stage to the second end of the first rotation stage; and is configured to rotate about the first central axis of the first rotation stage; a second rotation stage comprising a second central axis, a third end, and a fourth end, wherein the second central axis extends from the third end to the fourth end of the second rotation stage, wherein the second rotation stage: further comprises a second optical fiber channel, wherein the second optical fiber channel extends from the third end of the second rotation stage to the fourth end of the second rotation stage; and is configured to rotate about the second central axis of the second rotation stage; a first light source positioned to emit light onto the first optical fiber channel at an oblique angle from the first optical fiber channel; a second light source positioned to emit light onto the second optical fiber channel at an oblique angle from the second optical fiber channel; a reflector positioned between the first rotation stage and the second rotation stage; and an image sensor positioned to generate an initial image of a first emission face of a first optical fiber disposed within the first optical fiber channel and a second emission face of a second optical fiber disposed within the second optical fiber channel reflected by the reflector.

Example 2 is the optical fiber alignment and splicing system of any previous or subsequent example further comprising a first rigidly mounted static immobilizer, wherein the first rigidly mounted static immobilizer is in contact with a portion of a first optical fiber when positioned in the first optical fiber channel and is configured to secure the first optical fiber onto the first rotation stage.

Example 3 is the optical fiber alignment and splicing system of any previous or subsequent example further comprising a second rigidly mounted static immobilizer, wherein the second rigidly mounted static immobilizer is in contact with a portion of a second optical fiber when positioned in the second optical fiber channel and is configured to secure the second optical fiber onto the second rotation stage.

Example 4 is the optical fiber alignment and splicing system of any previous or subsequent example wherein the first rigidly mounted static immobilizer is positioned between the first rotation stage and the reflector and the second rigidly mounted static immobilizer is positioned between the second rotation stage and the reflector.

Example 5 is the optical fiber alignment and splicing system of any previous or subsequent example wherein the first rigidly mounted static immobilizer comprises a vacuum chuck.

Example 6 is the optical fiber alignment and splicing system of any previous or subsequent example wherein the reflector is removable.

Example 7 is the optical fiber alignment and splicing system of any previous or subsequent example further comprising a first mechanical immobilizer, wherein the first mechanical immobilizer is configured to secure the first optical fiber when the first rotation stage rotates about the first central axis of the first rotation stage.

Example 8 is the optical fiber alignment and splicing system of any previous or subsequent example further comprising a second mechanical immobilizer, wherein the second mechanical immobilizer is configured to secure the second optical fiber when the second rotation stage rotates about the second central axis of the second rotation stage.

Example 9 is the optical fiber alignment and splicing system of any previous or subsequent example wherein the first mechanical immobilizer is positioned between the first rotation stage and the first rigidly mounted static immobilizer and the second mechanical immobilizer is positioned between the second rotation stage and the second rigidly mounted static immobilizer.

Example 10 is the optical fiber alignment and splicing system of any previous or subsequent example further comprising a first optical fiber provided in the first optical fiber channel and a second optical fiber provided in the second optical fiber channel, wherein the first optical fiber and the second optical fiber each comprise one or more stress rods.

Example 11 is the optical fiber alignment and splicing system of any previous or subsequent example further comprising a first optical fiber provided in the first optical fiber channel and a second optical fiber provided in the second optical fiber channel, wherein the first optical fiber and the second optical fiber each comprise one or more patterned microstructures.

Example 12 is a method of aligning an optical fiber, the method comprising: placing a first optical fiber on a first rotation stage; placing a second optical fiber on a second rotation stage; securing the first optical fiber on the first rotation stage; securing the second optical fiber on the second rotation stage; collecting an initial image of a first emission face of the first optical fiber and a second emission face of the second optical fiber; calculating an alignment offset based on the initial image; rotating the first optical fiber to a modified position if the alignment offset is not within a tolerance; iteratively collecting at least one more additional image of the first emission face of the first optical fiber and the second emission face of the second optical fiber; and releasing the optical fiber if the alignment offset is within the tolerance.

Example 13 is the method of aligning the optical fiber of any previous or subsequent example wherein calculating the alignment offset based on the initial image comprises: determining a first alignment offset for the first optical fiber; and determining a second alignment offset for the second optical fiber.

Example 14 is the method of aligning the optical fiber of any previous or subsequent example wherein calculating the alignment offset based on the initial image comprises:

determining a rotational offset based on the initial image; and determining a translational offset based on the initial image.

Example 15 is the method of aligning the optical fiber of any previous or subsequent example wherein determining the rotational offset based on the initial image comprises:

identifying a first region and a second region in the initial image of the first emission face;

identifying a third region and a fourth region in the initial image of the second emission face;

calculating a first degree of rotational offset of the first optical fiber based on the first region and the second region; calculating a second degree of rotational offset of the second optical fiber based on the third region and the fourth region; and calculating the rotational offset based on the first degree of rotational offset and the second degree of rotational offset.

Example 16 is the method of aligning the optical fiber of any previous or subsequent example wherein securing the first optical fiber on the first rotation stage comprises: contacting the first optical fiber with a vacuum chuck; and inducing a vacuum on the first optical fiber using the vacuum chuck.

Example 17 is the method of aligning the optical fiber of any previous or subsequent example further comprising: determining the alignment offset is not within the tolerance; after determining that the alignment offset is not within the tolerance, releasing the first optical fiber; and after rotating the first optical fiber to the modified position, securing the first optical fiber on the first rotation stage in the modified position.

Example 18 is the method of aligning the optical fiber of any previous or subsequent example wherein the method further comprises: after determining the alignment offset is not within the tolerance, closing a mechanical immobilizer about the first optical fiber to immobilize the first optical fiber; and after rotating the first optical fiber to the modified position, opening the mechanical immobilizer about the first optical fiber to release the first optical fiber.

Example 19 is the method of aligning the optical fiber of any previous or subsequent example wherein rotating the first optical fiber to the modified position if the alignment offset is not within the tolerance further comprises: rotating the first optical fiber based on the rotational offset of the first optical fiber; and translating the first optical fiber based on the translational offset of the first optical fiber.

Example 20 is the method of aligning the optical fiber of any previous or subsequent example further comprising: determining that the alignment offset is within the tolerance; and releasing the first optical fiber from the first rotation stage.

Example 21 is the method of aligning the optical fiber of any previous or subsequent example wherein the method further comprises: removing equipment between the first optical fiber and the second optical fiber; and contacting the first emission face of the first optical fiber with the second emission face of the second optical fiber.

Example 22 is the method of aligning the optical fiber of any previous or subsequent example further comprising: splicing the first emission face of the first optical fiber to the second emission face of the second optical fiber.

Example 23 is a method of aligning an optical fiber, the method comprising: placing a first optical fiber on a first rotation stage; engaging a first static immobilizer to secure the first optical fiber on the first rotation stage; collecting an initial image of a first emission face of the first optical fiber; determining, based on the initial image, a first position of the first emission face; determining a first target position for the first emission face; disengaging the first static immobilizer to release the first optical fiber; engaging a first mechanical immobilizer to secure the first optical fiber during rotation; rotating the first optical fiber to the first target position; and disengaging the first mechanical immobilizer to release the first optical fiber.

Example 24 is the method of aligning the optical fiber of any previous or subsequent example, further comprising: placing a second optical fiber on a second rotation stage;

engaging a second static immobilizer to secure the second optical fiber on the second rotation stage; collecting the initial image, wherein the initial image comprises the first emission face of the first optical fiber and a second emission face of the second optical fiber; determining, based on the initial image, a second position of the second emission face; determining a second target position for the second emission face; disengaging the second static immobilizer to release the second optical fiber; engaging a second mechanical immobilizer to secure the second optical fiber during rotation; rotating the second optical fiber to the second target position; and disengaging the second mechanical immobilizer to release the second optical fiber.

Example 25 is the method of aligning the optical fiber of any previous or subsequent example, further comprising: engaging, after rotation, the first static immobilizer to secure the first optical fiber; collecting a second image of the first emission face; and determining a modified position of the first emission face.

Example 26 is the method of aligning the optical fiber of any previous or subsequent example, further comprising: determining that the modified position of the first emission face is within a threshold of the first target position; and disengaging the first static immobilizer to release the first optical fiber.

What is claimed is:

1. An optical fiber alignment and splicing system comprising:

a first rotation stage comprising a first central axis, a first end, and a second end, wherein the first central axis extends from the first end to the second end of the first rotation stage, wherein the first rotation stage:

further comprises a first optical fiber channel configured to support a first optical fiber, wherein the first optical fiber channel extends from the first end of the first rotation stage to the second end of the first rotation stage; and is configured to rotate about the first central axis of the first rotation stage;

a second rotation stage comprising a second central axis, a third end, and a fourth end, wherein the second central axis extends from the third end to the fourth end of the second rotation stage, wherein the second rotation stage:

further comprises a second optical fiber channel configured to support a second optical fiber, wherein the second optical fiber channel extends from the third end of the second rotation stage to the fourth end of the second rotation stage; and is configured to rotate about the second central axis of the second rotation stage;

a first light source positioned to emit first light onto the first optical fiber supported in the first optical fiber channel at an oblique angle from the first optical fiber channel, with the first light at least partially coupled into, propagating in, and exiting the first optical fiber;

a second light source positioned to emit second light onto the second optical fiber supported in the second optical fiber channel at an oblique angle from the second optical fiber channel, with the second light at least partially coupled into, propagating in, and exiting the second optical fiber;

a reflector positioned between the first rotation stage and the second rotation stage; and an image sensor positioned to generate an initial image of the first light exiting a first emission face of the first optical fiber supported in the first optical fiber channel and the second light exiting a second emission face of the second optical fiber supported in the second optical fiber channel reflected by the reflector.

2. The optical fiber alignment and splicing system of claim 1 comprising a first rigidly mounted static immobilizer, wherein the first rigidly mounted static immobilizer is in contact with a portion of a first optical fiber when supported in the first optical fiber channel and is configured to secure the first optical fiber onto the first rotation stage.

3. The optical fiber alignment and splicing system of claim 2 further comprising a second rigidly mounted static immobilizer, wherein the second rigidly mounted static immobilizer is in contact with a portion of a second optical fiber when supported in the second optical fiber channel and is configured to secure the second optical fiber onto the second rotation stage.

4. The optical fiber alignment and splicing system of claim 3 wherein the first rigidly mounted static immobilizer is positioned between the first rotation stage and the reflector and the second rigidly mounted static immobilizer is positioned between the second rotation stage and the reflector.

5. The optical fiber alignment and splicing system of claim 3 wherein the first rigidly mounted static immobilizer comprises a vacuum chuck.

6. The optical fiber alignment and splicing system of claim 3 further comprising a first mechanical immobilizer, wherein the first mechanical immobilizer is configured to secure the first optical fiber when the first rotation stage rotates about the first central axis of the first rotation stage.

7. The optical fiber alignment and splicing system of claim 6 further comprising a second mechanical immobilizer, wherein the second mechanical immobilizer is configured to secure the second optical fiber when the second rotation stage rotates about the second central axis of the second rotation stage.

8. The optical fiber alignment and splicing system of claim 7 wherein the first mechanical immobilizer is positioned between the first rotation stage and the first rigidly mounted static immobilizer and the second mechanical immobilizer is positioned between the second rotation stage and the second rigidly mounted static immobilizer.

9. The optical fiber alignment and splicing system of claim 1 wherein the reflector is removable.

10. The optical fiber alignment and splicing system of claim 1 wherein the first optical fiber and the second optical fiber each comprise one or more stress rods.

11. The optical fiber alignment and splicing system of claim 1 wherein the first optical fiber and the second optical fiber each comprise one or more patterned microstructures.

12. The optical fiber alignment and splicing system of claim 1, further comprising a translation stage configured to adjust the first rotation stage and the second rotation stage along one or more axes.

13. The optical fiber alignment and splicing system of claim 1, wherein the image sensor is configured to concurrently generate a single image of both the first emission face of the first optical fiber and the second emission face of the second optical fiber.

14. The optical fiber alignment and splicing system of claim 1, further comprising a controller operationally coupled to the first rotation stage, second rotation stage, and image sensor.

15. The optical fiber alignment and splicing system of claim 1, wherein the first optical fiber and second optical fiber each comprise polarization-maintaining fibers.

* * * * *